United States Patent
Klausner et al.

(10) Patent No.: US 10,906,017 B2
(45) Date of Patent: Feb. 2, 2021

(54) SOLAR THERMOCHEMICAL REACTOR AND METHODS OF MANUFACTURE AND USE THEREOF

(71) Applicant: University of Florida Research Foundation, Inc., Gainesville, FL (US)

(72) Inventors: James F. Klausner, Gainesville, FL (US); Joerg Petrasch, Dornbin (AT); Nicholas AuYeung, Gainesville, FL (US); Ayyoub Mehdizadeh Momen, Gainesville, FL (US); Rishi Mishra, Gainesville, FL (US); Jinchao Lu, Gainesville, FL (US); David Worthington Hahn, Gainesville, FL (US); Nikhil Sehgal, Navi Mumbai (IN); Renwei Mei, Gainesville, FL (US); Benjamin Greek, Gainesville, FL (US); Fotouh A. Al-Raqom, Gainesville, FL (US); Kyle Allen, Winter Garden, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 15/645,239

(22) Filed: Jul. 10, 2017

(65) Prior Publication Data

US 2017/0304794 A1 Oct. 26, 2017

Related U.S. Application Data

(63) Continuation of application No. 14/896,993, filed as application No. PCT/US2014/041660 on Jun. 10, 2014, now Pat. No. 10,072,224.

(Continued)

(51) Int. Cl.
*B01J 8/06* (2006.01)
*B01J 19/24* (2006.01)
(Continued)

(52) U.S. Cl.
CPC ........... *B01J 8/067* (2013.01); *B01J 8/009* (2013.01); *B01J 8/025* (2013.01); *B01J 8/0257* (2013.01);
(Continued)

(58) Field of Classification Search
CPC ....... Y02E 10/41; Y02E 60/364; Y02E 60/36; Y02E 10/40; Y02E 70/10; Y02P 20/134; F24S 20/20; F24S 10/80
See application file for complete search history.

(56) References Cited

U.S. PATENT DOCUMENTS

| 4,030,890 A | 6/1977 | Diggs |
| 4,115,927 A | 9/1978 | Rosensweig |

(Continued)

FOREIGN PATENT DOCUMENTS

| DE | 2735767 A1 | 3/1979 |
| EP | 1475581 A1 | 11/2004 |

(Continued)

OTHER PUBLICATIONS

Abanades et al.; "High-Temperature Solar Chemical Reactors for Hydrogen Production From Natural Gas Cracking", Chem. Eng. Comm., vol. 195, 2008, pp. 1159-1175.

(Continued)

*Primary Examiner* — Imran Akram
(74) *Attorney, Agent, or Firm* — Thomas | Horstemeyer, LLP

(57) ABSTRACT

Disclosed herein is a solar reactor comprising a reactor member; an aperture for receiving solar radiation, the aperture being disposed in a plane on a wall of the reactor (Continued)

member, where the plane is oriented at any angle other than parallel relative to the centerline of the reactor member; a plurality of absorber tubes, wherein the absorber tubes are oriented such that their respective centerlines are at an angle other than 90° relative to the centerline of the reactor member; and wherein the aperture has a hydraulic diameter that is from 0.2 to 4 times a hydraulic diameter of at least one absorber tube in the plurality of absorber tubes; and a reactive material, the reactive material being disposed in the plurality of absorber tubes.

10 Claims, 13 Drawing Sheets

Related U.S. Application Data

(60) Provisional application No. 61/833,525, filed on Jun. 11, 2013.

(51) Int. Cl.
    *B01J 8/00*     (2006.01)
    *B01J 8/02*     (2006.01)
    *B01J 19/12*     (2006.01)

(52) U.S. Cl.
    CPC ........... *B01J 8/0278* (2013.01); *B01J 8/0285* (2013.01); *B01J 19/127* (2013.01); *B01J 19/242* (2013.01); *B01J 2208/00451* (2013.01); *B01J 2208/065* (2013.01); *B01J 2219/00144* (2013.01); *B01J 2219/24* (2013.01)

(56) References Cited

U.S. PATENT DOCUMENTS

| | | | |
|---|---|---|---|
| 4,292,171 A | 9/1981 | Mayer et al. | |
| 4,319,893 A | 3/1982 | Hatch et al. | |
| 4,332,775 A | 6/1982 | Genequand et al. | |
| 4,430,254 A | 2/1984 | Passariello | |
| 4,462,391 A | 7/1984 | Laussermair et al. | |
| 4,876,628 A * | 10/1989 | Goldner | G02F 1/1525 |
| | | | 361/313 |
| 5,143,668 A | 9/1992 | Hida | |
| 5,245,986 A | 9/1993 | Karni | |
| 5,323,764 A | 6/1994 | Karni et al. | |
| 5,489,492 A * | 2/1996 | Asami | H01M 4/02 |
| | | | 429/212 |
| 5,863,850 A | 1/1999 | Nawa | |
| 5,931,158 A | 8/1999 | Buck | |
| 6,516,794 B2 | 2/2003 | Karni et al. | |
| 6,633,042 B1 | 10/2003 | Funken et al. | |
| 6,780,457 B2 | 8/2004 | Baumann et al. | |
| 7,033,570 B2 | 4/2006 | Weimer et al. | |
| 7,140,181 B1 | 11/2006 | Jensen et al. | |
| 7,935,254 B2 | 5/2011 | Kongmark et al. | |
| 8,110,174 B2 | 2/2012 | Kodama | |
| 8,187,731 B2 | 5/2012 | Weimer | |
| 8,287,610 B2 | 10/2012 | Weimer et al. | |
| 8,388,706 B2 | 3/2013 | Ugolin | |
| 2003/0208959 A1 | 11/2003 | Weimer et al. | |
| 2005/0175533 A1 | 8/2005 | Thomas et al. | |
| 2006/0188433 A1 | 8/2006 | Weimer et al. | |
| 2006/0229476 A1 | 10/2006 | Mitchell et al. | |
| 2008/0086946 A1* | 4/2008 | Weimer | C01B 3/586 |
| | | | 48/89 |
| 2008/0089834 A1 | 4/2008 | Kodama | |
| 2008/0236389 A1 | 10/2008 | Leedy et al. | |
| 2009/0142578 A1 | 6/2009 | Riman et al. | |
| 2009/0232725 A1 | 9/2009 | Aaron | |
| 2010/0140154 A1 | 6/2010 | Colon et al. | |
| 2010/0209328 A1* | 8/2010 | Bi | C01F 7/302 |
| | | | 423/344 |
| 2010/0237291 A1* | 9/2010 | Simmons | B01J 19/2445 |
| | | | 252/373 |
| 2010/0242352 A1 | 9/2010 | Perkins et al. | |
| 2010/0303692 A1 | 12/2010 | Perkins et al. | |
| 2011/0048690 A1 | 3/2011 | Reppel et al. | |
| 2011/0068308 A1* | 3/2011 | Takaoka | C09D 7/62 |
| | | | 252/587 |
| 2011/0136027 A1 | 6/2011 | Chen et al. | |
| 2012/0145965 A1* | 6/2012 | Simmons | C07C 29/152 |
| | | | 252/373 |
| 2012/0295113 A1 | 11/2012 | Kurizoe | |
| 2012/0302436 A1 | 11/2012 | Vormberg | |
| 2013/0101867 A1* | 4/2013 | Yukinobu | C03C 17/006 |
| | | | 428/702 |
| 2013/0266502 A1 | 10/2013 | Lichty et al. | |
| 2013/0319501 A1* | 12/2013 | Hilliard | H01L 31/0525 |
| | | | 136/246 |
| 2014/0072836 A1* | 3/2014 | Mills | G21D 7/00 |
| | | | 429/8 |
| 2014/0190080 A1* | 7/2014 | McAlister | C10J 3/72 |
| | | | 48/89 |
| 2014/0290248 A1* | 10/2014 | Kobayashi | F03G 6/00 |
| | | | 60/641.11 |
| 2014/0291570 A1 | 10/2014 | Klausner | |
| 2014/0346034 A1 | 11/2014 | Klausner | |
| 2015/0037246 A1* | 2/2015 | Morico | C01B 3/48 |
| | | | 423/652 |
| 2015/0047985 A1* | 2/2015 | Karni | C25B 1/04 |
| | | | 205/340 |
| 2015/0054284 A1 | 2/2015 | Nathan et al. | |
| 2015/0321158 A1 | 11/2015 | Klausner | |
| 2016/0122670 A1 | 5/2016 | Klausner et al. | |

FOREIGN PATENT DOCUMENTS

| | | |
|---|---|---|
| JP | H10279955 A | 10/1998 |
| KR | 20110037329 A | 4/2011 |
| KR | 1020110037329 A | 4/2011 |
| KR | 20110077154 A | 7/2011 |
| WO | 9600125 A1 | 1/1996 |
| WO | 03004942 A1 | 1/2003 |
| WO | 03076334 A1 | 9/2003 |
| WO | 2010041014 A1 | 4/2010 |
| WO | 2013021397 A1 | 2/2013 |

OTHER PUBLICATIONS

Abanades, Stephane et al., "CO2 splitting by thermo-chemical looping based on ZrxCe1—xO2 oxygen carriers for synthetic fuel generation" Fuel, vol. 102, Dec. 2012, pp. 180-186, Special Section: ACS Clean Coal.

Coker et al.; "Ferrite-YSZ composites for solar thermochemical production of synthetic fuels: in operando characterization of CO2 reduction"; J.Mater.Chem; 21; 2011, 10767-10776.

DE2735767 Published Mar. 1, 1979; Machine Translation; 19 Pages.

Diver et al.; "Testing of a CR5 Solar Thermochemical Heat Engine Prototype", Proceedings of the ASME 2010 4th International Conference on Energy Sustainability, May 2010, pp. 1-8.

Diver, Richard B. et al., "Solar Thermochemical Water-Splitting Ferrite-Cycle Heat Engines", J. Sol. Energy Eng., Nov. 2008, vol. 130, Issue 4, Apr. 10, 2001 (8 pages).

European Extended Search Report for EP Application No. 12859196. 3; dated Dec. 1, 2015 (6 pages).

European Extended Search Report for EP Application No. 13865853. 9; dated Aug. 19, 2016 (5 pages).

Evans et al., "Materials Development for the CR5 Solar Thermochemical Heat Engine", ASME 2006 International Solar Energy Conference (ISEC2006), Jul. 8-13, 2006 , Denver, Colorado, USA Sponsor: Solar Energy Division, Solar Energy, Paper No. IS, 10 pages.

Extended European Search Report for EP Application No. 12811990. 6; Report dated Feb. 2, 2015 (6 pages).

G3okon et al., "Monoclinic zirconia-supported Fe3O4 for the two-step water-splitting thermochemical cycle at high thermal reduc-

(56) References Cited

OTHER PUBLICATIONS tion temperatures of 1400-1600° C", International Journal of Hydrogen Energy, vol. 34, Issue 3, Feb. 2009,pp. 1208-1217.
Gokon, Nobuyuki et al., "Ferrite/zirconia-coated foam device prepared by spin coating for solar demonstration of thermochemical water-splitting", International Journal of Hydrogen Energy, vol. 36, Issue 3, Feb. 2011, pp. 2014-2028.
Gokon, Nobuyuki et al., "Thermochemical two-step water-splitting for hydrogen production using Fe-YSZ particles and a ceramic foam device", Energy, vol. 33, Issue 9, Sep. 2008, pp. 1407-1416.
Guillot, Stephanie, et al. "Corrosion effects between molten salts and thermal storage material for concentrated solar power plants", Applied Energy, vol. 94, Jun. 2012, pp. 174-181.
Herrmann, Ulf, et al. "Two-tank molten salt storage for parabolic trough solar power plants", Energy, vol. 29, Issues 5-6, Apr.-May 2004, pp. 883-893.
International Preliminary Report on Patentability for Application No. PCT/US2012/045698 filed Jul. 6, 2012; dated Jan. 14, 2014; 6 pages.
International Preliminary Report on Patentability for Application No. PCT/US2012/071332 filed Dec. 21, 2012; dated Jun. 24, 2014; 7 pages.
International Preliminary Report on Patentability for International Application No. PCT/US2013/076037 International Filing date Dec. 18, 2013; Report dated Jun. 23, 2015; 6 pages.
International Preliminary Report on Patentability for International Application No. PCT/US2014/041660, International Filing Date Jun. 10, 2014, dated Dec. 15, 2015, 7 pages.
International Search Report for Application No. PCT/US2012/045698 filed Jul. 6, 2012; dated Jan. 21, 2013; 5 pages.
International Search Report for Application No. PCT/US2012/071332 filed Dec. 21, 2012; dated Apr. 29, 2013; 5 pages.
International Search Report for International Application No. PCT/US2013/076037 International Filing date Dec. 18, 2013; Report dated Apr. 4, 2014; 5 pages.
International Search Report for International Application No. PCT/US2014/041660, International Filing Date Jun. 10, 2014, dated Nov. 5, 2014, 6 pages.
Kodama et al.; "A Two-Step Thermochemical Water Splitting by Iron-Oxide on Stabilized Zirconia", Journal of Solar Energy Engineering, vol. 128, No. 1, Jan. 2006, 5 pages.
Kodama, T. et al. "Thermochemical hydrogen production by a redox system of ZrO2-supported Co(II)-ferrite", Solar Energy, vol. 78, Issue 5, May 2005, Solar Hydrogen pp. 623-631.
Koepf et al.; "A novel beam-down, gravity-fed, solar thermochemical receiver/reactor for direct solid particle decomposition: Design, modeling, and experimentation"; International Journal of Hydrogen Energy, vol. 37, 2012, pp. 16871-16887.
Lichty , Paul et al., "Atomic layer deposited thin film metal oxides for fuel production in a solar cavity reactor", International Journal of Hydrogen Energy, vol. 37, Issue 22, Nov. 2012, pp. 16888-16894.
Lichty et al., "Rapid High Temperature Solar Thermal Biomass Gasification in a Prototype Cavity Reactor", Journal of Solar Energy Engineering, vol. 132, Feb. 2010, 7 pages.
Mehdizadeh, Ayyoub M., "Enhancement of thermochemical hydrogen production using an iron-silica magnetically stabilized porous structure", International Journal of Hydrogen Energy, vol. 37, Issue 11, Jun. 2012, pp. 8954-8963.
Meier et al., "Multitube Rotary Kiln for the Industrial Solar Production of Lime", Journal of Solar Energy Engineering, vol. 127, Aug. 2005, 10 pages.
Meier, Anton et al., "Solar chemical reactor technology for industrial production of lime" Solar Energy 80 (2006) 1355-1362.
Rodat et al., "Co-production of hydrogen and carbon black from solar thermal methane splitting in a tubular reactor prototype", Solar Energy, vol. 85, 2011, pp. 645-652.
Rodat et al., "High-Temperature Solar Methane Dissociation in a Multitubular Cavity-Type Reactor in the Temperature Range 1823-2073 K", Energy & Fuels, vol. 23, 2009, pp. 2666-2674.
Rodat et al., "Hydrogen production from solar thermal dissociation of natural gas: development of a 10 kW solar chemical reactor prototype", Solar Energy, vol. 83, 2009, pp. 1599-1610.
Roeb, Martin, et al. "Materials-Related Aspects of Thermochemical Water and Carbon Dioxide Splitting: A Review" Materials 2012, 5(11), 2015-2054; Published: Oct. 24, 2012.
Wieckert, C. "Design Studies for a Solar Reactor Based on a Simple Radiative Heat Exchange Model" Journal of Solar Energy Engineering, Aug. 2005, vol. 127; pp. 425-429.
Written Opinion for Application No. PCT/US2012/045698 filed Jul. 6, 2012; dated Jan. 21, 2013; 5 pages.
Written Opinion for Application No. PCT/US2012/071332 filed Dec. 21, 2012; dated Apr. 29, 2013; 6 pages
Written Opinion for International Application No. PCT/US2013/076037 International Filing date Dec. 18, 2013; Report dated Apr. 4, 2014; 5 pages
Written Opinion for International Application No. PCT/US2014/041660, International Filing Date Jun. 10, 2014, dated Nov. 5, 2014, 6 pages.
Yang, Zhen, et al. "Thermal analysis of solar thermal energy storage in a molten-salt thermocline", Solar Energy, vol. 84, Issue 6, Jun. 2010, pp. 974-985.
Zhu, Xing, et al. "Hydrogen and syngas production from two-step steam reforming of methane over $CeO_2$—$Fe_2O_3$ oxygen carrier", Journal of Rare Earths, vol. 28, Issue 6, Dec. 2010, pp. 907-913.

\* cited by examiner

SOLAR THERMOCHEMICAL REACTOR AND METHODS OF MANUFACTURE AND USE THEREOF

CROSS REFERENCE TO RELATED APPLICATIONS

This application is a continuation in part of U.S. patent application Ser. No. 14/896,993 filed on Dec. 9, 2015, which claims priority to National Stage Application Serial No. PCT/US2014/041660 filed on Jun. 10, 2014 which claims the benefit of U.S. Provisional Patent Application Ser. No. 61/833,525 filed on Jun. 11, 2013, the entire contents of which are hereby incorporated by reference.

STATEMENT REGARDING FEDERALLY SPONSORED RESEARCH OR SUPPORT

This invention was made with Government support under DE AR000184 awarded by the Department of Energy. The Government has certain rights in this invention.

BACKGROUND

This disclosure relates to a solar thermochemical reactor and methods of manufacture and use thereof.

Solar thermochemistry is a newly emerging technology for the production of fuels using highly concentrated solar radiation. Solar power is used to facilitate thermochemical reactions. Solar thermochemical reactors are in the early stages of development. Significant challenges are posed by the use of solar energy as a renewable energy source, which makes it difficult to deploy on a large scale. Solar energy is, by its nature, transient as it is dependent upon exposure to the sun. Solar thermochemical reactions can proceed at very high temperatures. Solar thermochemical reactors can also employ a window manufactured from an optically transparent material (e.g., glass, plastic, or combinations thereof) to admit highly concentrated radiation to the reaction site. The optically transparent material can be structurally weak and extremely susceptible to staining and subsequent damage due to thermal stresses. In addition, thermochemical reactions can result in sintering of the reactant materials that reduces their internal surface area and adversely affects the chemical kinetics of the reaction.

Solar thermochemical reactors can also face other significant challenges which may affect the thermochemical efficiency of the solar thermochemical reactor. Such challenges include the thermal distribution pattern in the reactor, re-radiation within the reactor, loss of heat, durability and effectiveness of the materials used to form the reactor as well as reactive material used therein, the pressure and the manner in which the pressure is applied to the reactor and maintenance and/or repair of the reactor over time.

It is therefore desirable to develop solar thermochemical reactors which operate under lower temperature and/or pressure conditions, do not use a window that is manufactured from an optically transparent material, improve thermal distribution in the reactor and facilitate control of the chemical kinetics of the thermochemical reaction. It is also desirable to develop a method of using solar thermochemical reactors in a manner which maximizes the availability of solar energy during non-transient periods.

SUMMARY

Disclosed herein is a solar reactor comprising a reactor member; an aperture for receiving solar radiation, the aperture being disposed in a plane on a wall of the reactor member, where the plane is oriented at any angle other than parallel relative to the centerline of the reactor member; a plurality of absorber tubes, wherein the absorber tubes are oriented such that their respective centerlines are at an angle other than 90 degrees relative to the centerline of the reactor member; and wherein the aperture has a hydraulic diameter that is from 0.2 to 4 times a hydraulic diameter of at least one absorber tube in the plurality of absorber tubes; and a reactive material, the reactive material being disposed in the plurality of absorber tubes.

Disclosed herein too is a method of manufacturing a solar reactor comprising disposing a plurality of absorber tubes within a reactor member, wherein the absorber tubes are oriented such that their respective centerlines are at an angle other than 90 degrees relative to the centerline of the reactor member; and wherein the reactor member has an aperture for receiving solar radiation, the aperture being disposed in a plane on a wall of the reactor member, where the plane is oriented at any angle other than parallel relative to the centerline of the reactor member; a plurality of absorber tubes; where the aperture has a hydraulic diameter that is from 0.2 to 4 times a hydraulic diameter of at least one absorber tube in the plurality of absorber tubes; and disposing a reactive material in the absorber tubes.

Disclosed herein too is a method of using a solar thermochemical reactor comprising disposing a plurality of absorber tubes within a reactor member, wherein the absorber tubes are oriented such that their respective centerlines are at an angle other than 90 degrees relative to the centerline of the reactor member; disposing an aperture in a plane on a wall of the reactor member; where the plane is oriented at any angle other than parallel relative to the centerline of the reactor member; and where the aperture has a hydraulic diameter that is from 0.2 to 4 times a hydraulic diameter of at least one absorber tube in the plurality of absorber tubes; disposing a reactive material in the absorber tubes; applying a vacuum to the reactor member; fluidizing the reactive material; disposing solar radiation onto the reactor member; carrying out a reduction reaction in the reactor; extracting oxygen from the reactor; disposing carbon dioxide and water onto the reactor material; carrying out an oxidation reaction in the reactor; and extracting carbon monoxide gas and hydrogen gas from the reactor.

DETAILED DESCRIPTION

Figure 1:
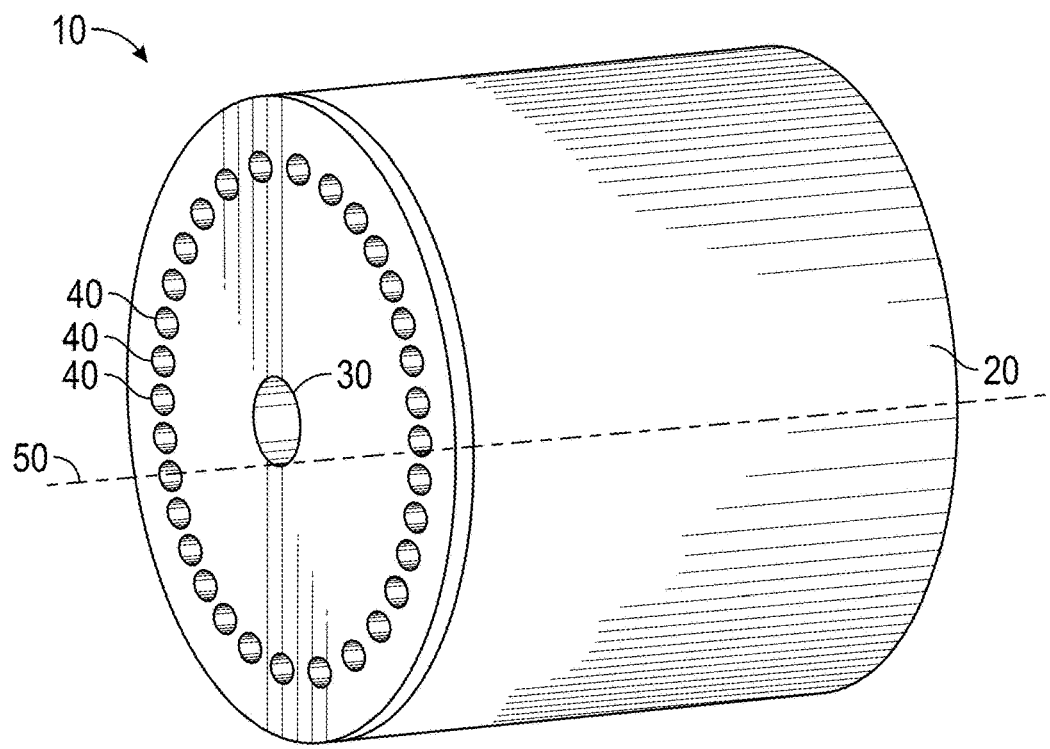
FIG. 1 is a photograph of a front view of an exemplary solar thermochemical reactor.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," and "inner" or "outer" may be used herein to describe one element's relationship to another element as illustrated in the Figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower," can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, the term "hydraulic diameter" shall refer to the hydraulic diameter of an object or portion of an object of any shape, including but not limited to, circular and non-circular and cylindrical and non-cylindrical shapes.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition term "comprising" encompasses the transition terms "consisting of" and "consisting essentially of."

Various numerical ranges are disclosed herein. These ranges are inclusive of the endpoints as well as numerical values between these endpoints. The numbers in these ranges and those on the endpoints are interchangeable.

Solar energy is the most abundant source of renewable energy. Because solar energy is an intermittent power source, storage of this energy is desirable for large-scale deployment and production of fuels. Solar thermochemistry can be used to produce synthetic gas ("syngas"), a precursor used for the production of clean and carbon neutral synthetic hydrocarbon fuels such as methanol, methane or synthetic petroleum. Solar thermochemistry can also be used to store concentrated solar energy in chemical energy carriers until production of syngas or fuel is desired. Thermochemical storage of concentrated solar energy is desirable because chemical energy carriers have a high energy density, are stable, can be stored indefinitely; and a complete infrastructure for their transport and storage already exists, i.e., the existing infrastructure for hydrocarbon fuel transport and storage.

Solar thermochemical reactors can be windowed, in which the window is manufactured from an optically transparent material. Such windowed designs present reliability issues due to weakness in mechanical structure and staining and limit the size of reactors, making it difficult to scale up solar reactor technology to an industrial level. In addition, metal reactor materials used in solar thermochemical reactors can be subject to undesirable sintering, which reduces the surface area of the metal reactor materials and causes the period during which the metal reactor materials are used for repeated reactor reaction cycles to become significantly reduced. The thermochemical reactions which are carried out in solar reactors also involve significant periods of time. For example, a single cycle to produce syngas using reduction and oxidation can take up to five hours.

Two-step metal oxide looping processes involve a reduction reaction and an oxidation reaction to complete one "redox" cycle. The direct thermolysis of water can involve temperatures in excess of 2500° C. Two-step metal oxide looping processes can be advantageous because they avoid these extreme temperatures. Two-step metal oxide looping processes using volatile metal oxides such as zinc oxide can have disadvantages associated with avoiding recombination of the highly reactive gaseous metal-oxygen mixture produced. Such processes can also involve high temperatures to carry out the solar reduction/metal disassociation step.

In addition to windowed designs and high temperature reaction conditions, solar thermochemical reactors also face other significant challenges which affect the thermochemical efficiency of the solar reactor. Factors such as the thermal distribution pattern in the reactor, re-radiation within the reactor, loss of heat, durability and effectiveness of the materials used to form the reactor as well as reactive material used therein, the pressure and the manner in which the pressure is applied to the reactor and maintenance and/or repair of the reactor may affect the overall thermochemical efficiency of the solar reactor.

Disclosed herein are reactors and methods of manufacture and use thereof which address one or more of the above-described challenges. Disclosed herein is a solar thermochemical reactor comprising a reactor member, wherein the reactor member has an aperture for receiving solar radiation, the aperture being disposed in a plane on a wall of the reactor member, where the plane is oriented at any angle other than parallel relative to the centerline of the reactor member; a plurality of absorber tubes, wherein the absorber tubes are oriented such that their respective centerlines are at an angle other than 90° relative to the centerline of the reactor member; and the aperture having a hydraulic diameter that is from 0.2 to 4 times a hydraulic diameter of at least one absorber tube in the plurality of absorber tubes and a reactive material, the reactive material being disposed in the plurality of absorber tubes.

Disclosed herein too is a method of making a solar thermochemical reactor comprising disposing a plurality of absorber tubes within a reactor member, wherein the absorber tubes are oriented such that their respective centerlines are at an angle other than 90° relative to the centerline of the reactor member, and wherein the reactor member has an aperture for receiving solar radiation, the aperture being disposed in a plane on a wall of the reactor member, where the plane is oriented at any angle other than parallel relative to the centerline of the reactor member; and the aperture having a hydraulic diameter that is from 0.2 to 4 times a hydraulic diameter of at least one absorber tube in the plurality of absorber tubes and disposing a reactive material in the absorber tubes.

Figure 2:
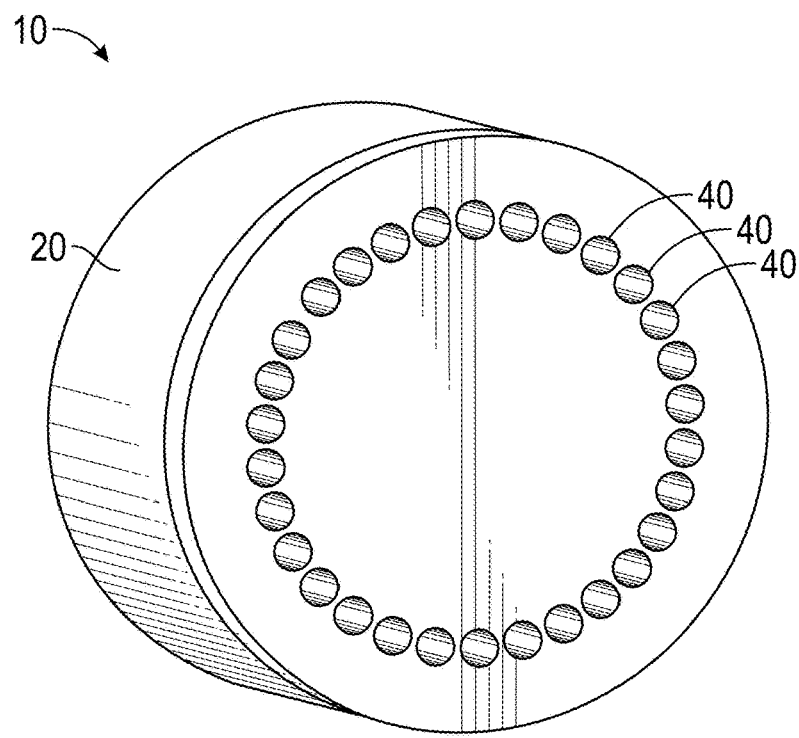
FIG. 2 is a photograph of a rear view of an exemplary solar thermochemical reactor.

In an exemplary embodiment, as depicted in FIGS. 1 and 2, the solar thermochemical reactor 10 comprises a reactor member 20, an aperture 30 for receiving solar radiation disposed with the reactor member 20 and a plurality of cavities 40 disposed with the reactor member 20. The aperture 30 is disposed in a plane on a wall of the reactor member, where the plane is oriented at any angle other than parallel relative to the centerline 50 of the reactor member. As can be seen from the front and rear views in FIGS. 1 and 2, the plurality of cavities 40 extend (longitudinally) from one end of the reactor member 20 to the other end of the reactor member 20.

Figure 3:
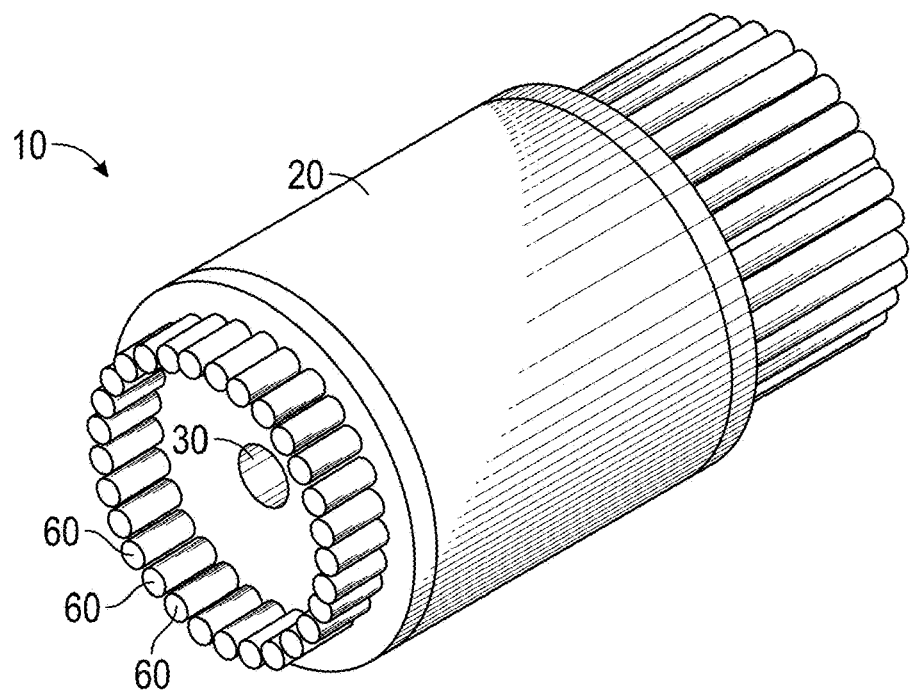
FIG. 3 is a depiction of an exemplary solar thermochemical reactor which includes a plurality of horizontally (longitudinally) oriented absorber tubes.

As depicted in FIG. 3, the solar thermochemical reactor 10 further comprises a plurality of absorber tubes 60 disposed within the cavities 40 of the reactor member 20. The plurality of absorber tubes 60 are arranged concentrically, i.e., equidistant from a center of the aperture 30, around the inner perimeter of the reactor member 20. The angle of orientation of the plurality of absorber tubes 60 overcomes inefficient thermal distribution problems associated with vertically-oriented solar reactors in which one or more absorber tubes are oriented such that their respective centerlines are at an angle other than 90° relative to the centerline of the reactor member. Accordingly, the absorber tubes in the plurality of absorber tubes 60 are oriented horizontally relative to the center line 50 of the reactor member 20 such that the angle of orientation is other than 90°. In an embodiment, the absorber tubes 60 are oriented such that a centerline of the tubes is inclined at an angle of greater than zero degrees to 60 degrees, preferably 2 to 45 degrees and more preferably 3 to 30 degrees relative to the centerline 50 of the solar thermochemical reactor 10.

A reactive material (not shown) is disposed in each of the absorber tubes in the plurality of absorber tubes 60. The absorber tubes in the plurality of absorber tubes 60 further comprise a material port at one open end of the absorber tube from which reaction products are extracted and reactant materials may be introduced. The reactor members 10 and the plurality of absorber tubes 60 of the reactor are of any shape known to those of skill in the art, specifically a cylindrical shape.

In an embodiment, the plurality of absorber tubes 60 are arranged concentrically, i.e., equidistant from the aperture 30, around the inner perimeter of the reactor member 20. In an exemplary embodiment, the position and arrangement of the plurality of absorber tubes 60 relative to the outer perimeter of the aperture 30 are selected to maximize the exposure of solar radiation to the reactive material disposed in the plurality of absorber tubes 60 and to minimize solar radiation or heat from traveling outside of the absorber tubes 60 within the reactor member 20. When absorber tubes in the plurality of absorber tubes 60 are positioned too close to the aperture 30, the reactor 10 may heat up too quickly and re-radiate heat out of the aperture 30. When the absorber tubes in the plurality of absorber tubes 60 are positioned too far away from the aperture 30, it may take too long to heat the reactor 10 and result in a greater surface area for the loss of convective heat. Accordingly, the position, or distance, of the absorber tubes 60 relative to the outer perimeter of the aperture 30 is selected to maximize the heat generated in and minimize the heat lost from the solar reactor 10 while affording control of the kinetics of the thermochemical reactions therein.

In an embodiment, the ratio of the distance from the outer perimeter of the aperture 30 to the inner edge of the outer perimeter of the absorber tubes in the plurality of absorber tubes 60 to the hydraulic diameter of the aperture 30 is 5:1. In another embodiment, the ratio of the distance from the outer perimeter of the aperture 30 to the outer perimeter of the absorber tubes in the plurality absorber tubes 60 to the hydraulic diameter of the aperture 30 is 3.5:1. In yet another embodiment, the ratio of the distance from the outer perimeter of the aperture 30 to the outer perimeter of the absorber tubes in the plurality of absorber tubes 60 to the hydraulic diameter of the aperture 30 is 2:1. In still another embodiment, the ratio of the distance from the outer perimeter of the aperture 30 to the outer perimeter of the absorber tubes in the plurality of absorber tubes 60 to the hydraulic diameter of the aperture 30 is 1:1. In other words, the ratio of the distance from the outer perimeter of the aperture 30 to the outer perimeter of the absorber tubes to the diameter of the aperture 30 is 5:1 to 1:1.

Although the reactor and absorber tubes are illustrated in the figures as being generally cylindrical in shape, and although the term "tube" is used to describe that tubular portion of the reactor which is filled with the reactive material, it should be understood that the relative shapes of the reactor and absorber tubes are not so limited. The reactor and/or absorber tubes may be of any shape and may be similarly or differently shaped. Non-limiting examples of such shapes include cylindrical or tubular, cubic, and/or spherical.

Figure 4:
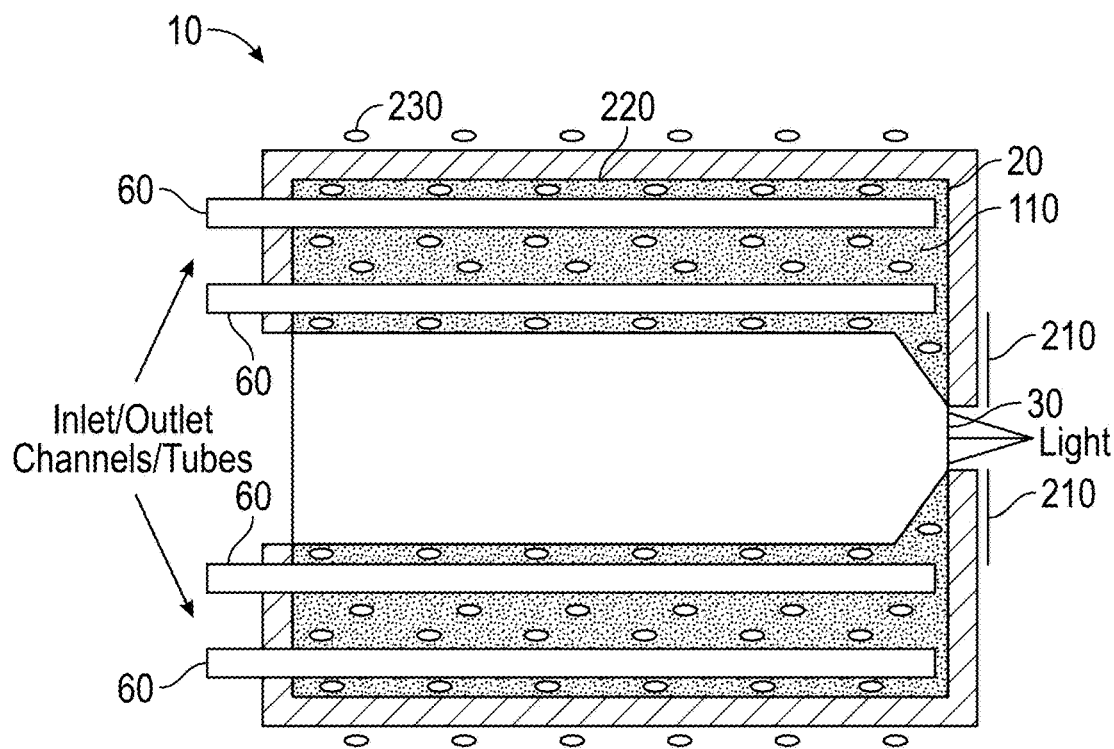
FIG. 4 is a cross-section view of an exemplary solar thermochemical reactor which includes a plurality of longitudinally oriented absorber tubes.

As demonstrated in the cross-section of the reactor 10 depicted in FIG. 4, in an embodiment, the absorber tubes in plurality of absorber tubes 60 are disposed at different distances from the outer perimeter of the aperture 30. In one embodiment, the absorber tubes in the plurality of absorber tubes 60 are arranged concentrically from the aperture 30 such that there are no gaps or no significant gaps between adjacent absorber tubes, without the absorber tubes touching one another. In another embodiment, the absorber tubes in the plurality of absorber tubes 60 are arranged in two or more concentrically arranged circles around the inner perimeter of the reactor member 20. In still another embodiment, the absorber tubes in the plurality of absorber tubes 60 are arranged in two or more concentrically arranged circles around the inner perimeter of the reactor member 20 and are further arranged such that there are no gaps or no significant gaps between adjacent absorber tubes, without the absorber tubes touching one another. Positioning the absorber tubes in close proximity to one another reduces the thermal loss from the individual absorber tubes since heat must first travel through the absorber tubes containing the reactive material before exiting the reactor member 20.

In an embodiment, the aperture 30, the plurality of cavities 40, and the plurality of absorber tubes 60 are oriented at an angle of from 0° to less than 90° relative to the center line 50 of the reactor member 20. In another embodiment, the aperture 30, the plurality of cavities 40, and the plurality of absorber tubes 60 are oriented at an angle of from 0° to 45° relative to the center line 50 of the reactor member 20. In yet another embodiment, the aperture 30, the plurality of cavities 40, and the plurality of absorber tubes are horizontally (longitudinally) oriented relative to the center line 50 of the reactor member 20 such that they are substantially parallel or parallel to the center line 50 of the reactor member 20.

The aperture 30 for receiving solar radiation allows solar radiation in, and the radiation is trapped within the reactor member 20 and eventually absorbed by the walls of the plurality of cavities 40 in the reactor member 20 and the plurality of absorber tubes 60.

In an embodiment, the absorber tubes in the plurality of absorber tubes 60 each have a hydraulic diameter (HD) of from 10 mm to 500 mm. In another embodiment, the absorber tubes in the plurality of absorber tubes 60 each have a hydraulic diameter of from 12.5 mm to 200 mm. In yet another embodiment, the absorber tubes in the plurality of absorber tubes 60 each have a hydraulic diameter of from 20 mm to 180 mm. In still another embodiment, the absorber tubes in the plurality of absorber tubes 60 each have a hydraulic diameter of from 50 mm to 150 mm. In an exemplary embodiment, each of the absorber tubes in the plurality of absorber tubes 60, which are equidistant from the aperture 30, have the same or substantially similar hydraulic diameter.

In an embodiment, the absorber tubes in the plurality of absorber tubes 60 have a length of from 10 to 500 cm. In another embodiment, the absorber tubes in the plurality of absorber tubes 60 have a length of from 10 to 100 cm. In yet another embodiment, the absorber tubes in the plurality of absorber tubes 60 have a length of from 20 to 90 cm. In still another embodiment, the absorber tubes in the plurality of absorber tubes 60 have a length of from 30 to 80 cm. In an exemplary embodiment, each of the absorber tubes in the plurality of absorber tubes 60, which are equidistant from the aperture 30, have the same or substantially similar length.

In an embodiment, the reactor member 20 has a length of from 10 to 500 cm. In another embodiment, the reactor member 20 has a length of from 20 to 100 cm. In yet another embodiment, the reactor member 20 has a length of from 30 to 90 cm. In still another embodiment, the reactor member 20 has a length of from 40 to 80 cm.

In an embodiment, the reactor member 20 has a hydraulic diameter of from 100 to 10000 mm. In another embodiment, the reactor member 20 has a hydraulic diameter of from 110 to 7500 mm. In yet another embodiment, the reactor member 20 has a hydraulic diameter of from 200 to 6000 mm. In still another embodiment, the reactor member 20 has a hydraulic diameter of from 200 to 3500 mm.

In an embodiment, the aperture 30 has a hydraulic diameter of from 10 mm to 500 mm. In another embodiment, the aperture 30 has a hydraulic diameter of from 15 mm to 100 mm. In yet another embodiment, the aperture 30 has a hydraulic diameter of from 20 mm to 90 mm. In still another embodiment, the aperture 30 has a hydraulic diameter of from 25 mm to 80 mm.

In an exemplary embodiment, the absorber tubes in the plurality of absorber tubes 60 have an hydraulic diameter (HD) of from 12.5 mm to 200 mm and a length of from 10 to 100 cm, the reactor member 20 has a length of from 10 to 500 cm and an hydraulic diameter of from 10 to 75 and the hydraulic diameter of the aperture 30 is from 10 mm to 100 mm for a reactor 10 rated for 10 kW of incident radiation. In an exemplary embodiment, the aforementioned dimensions are used in a 10 kW reactor.

The above units may be generally scaled up proportionally as needed to accommodate greater incident radiation. For a larger scale reactor, such as a reactor 10 rated for 100 kW of incident solar radiation, the length and dimension of the reactor member 20 and aperture 30 are increased; however, the size of the absorber tube hydraulic diameter may be limited by the thermal shock characteristics of the material used to form the absorber tubes. Once the absorber tubes reach a maximum usable hydraulic diameter, additional absorber tubes may be added to accommodate additional reactive material for thermochemical conversion in the solar reactor 10.

In an embodiment, the hydraulic diameter of the aperture 30 is from 0.2 to 4 times the hydraulic diameter of each absorber tube in the plurality of absorber tubes 60. In another embodiment, the hydraulic diameter of the reactor member 20 is from 5 to 20 times greater than the hydraulic diameter of the aperture 30.

As mentioned above, although the shape is depicted as cylindrical, the reactor member 20 and the plurality of absorber tubes 60 may each, independently, be of any shape and hydraulic diameter which is suitable for conducting solar thermochemical reactions. In an exemplary embodiment, the reactor member 20 and/or the absorber tubes in the plurality of absorber tubes 60 are cylindrically shaped. The shape of the reactor member 20 and the position, arrangement and/or orientation of the plurality of absorber tubes 60 disposed therein allow for uniform thermal distribution of incident solar radiation in the plurality of absorber tubes 60. Similarly, although not limited thereto, in an exemplary embodiment, the absorber tubes in the plurality of absorber tubes 60 are also cylindrically shaped or tubular. In another embodiment, the absorber tubes in the plurality of absorber tubes 60 are in the shape of a cone, a triangle, a pyramid and/or a pyramid and reverse pyramid as separate absorber tubes or integral units of each absorber tube.

In an embodiment, both ends of the absorber tubes in the plurality of absorber tubes are open, and are sealed using a seal assembly as discussed further below. In another embodiment, one end of the absorber tubes in the plurality of absorber tubes 60 is open, allowing for the reactive material to be introduced therein, while the other end is closed.

In an embodiment, one or both ends of the absorber tubes in the plurality of absorber tubes 60 extend beyond one or both ends of the reactor member 20. In another embodiment, one or both of the ends of the absorber tubes in the plurality of absorber tubes 60 are disposed wholly within the reactor 10 such that one or both ends of the absorber tubes do not extend beyond the ends of the reactor 10. In yet another embodiment, the plurality of absorber tubes do not fully extend through at least one end of the reactor 10 and/or a portion of the reactor member 20, and said at least one end of the reactor 10 and/or the reactor member 20 is shaped and/or coated with a reflective material such that the end forms at least one reflective surface which reflects heat in the reactive member 20 toward the absorber tubes 60. In still another embodiment, the at least one end of the reactor member 20 is shaped such that the end forms multiple reflective surfaces which are oriented at an angle such that the multiple reflective surfaces reflect heat in the reactive member 20 toward the absorber tubes 60. The at least one reflective surface and multiple reflective surfaces are selected to form any shape which is suitable to reflect heat toward the absorber tubes 60. Non-limiting examples of such shapes include a planar circle, a convex or concave shape, a triangle, an inverted triangle, and the like, or a combination comprising at least one of the foregoing.

Figure 5:
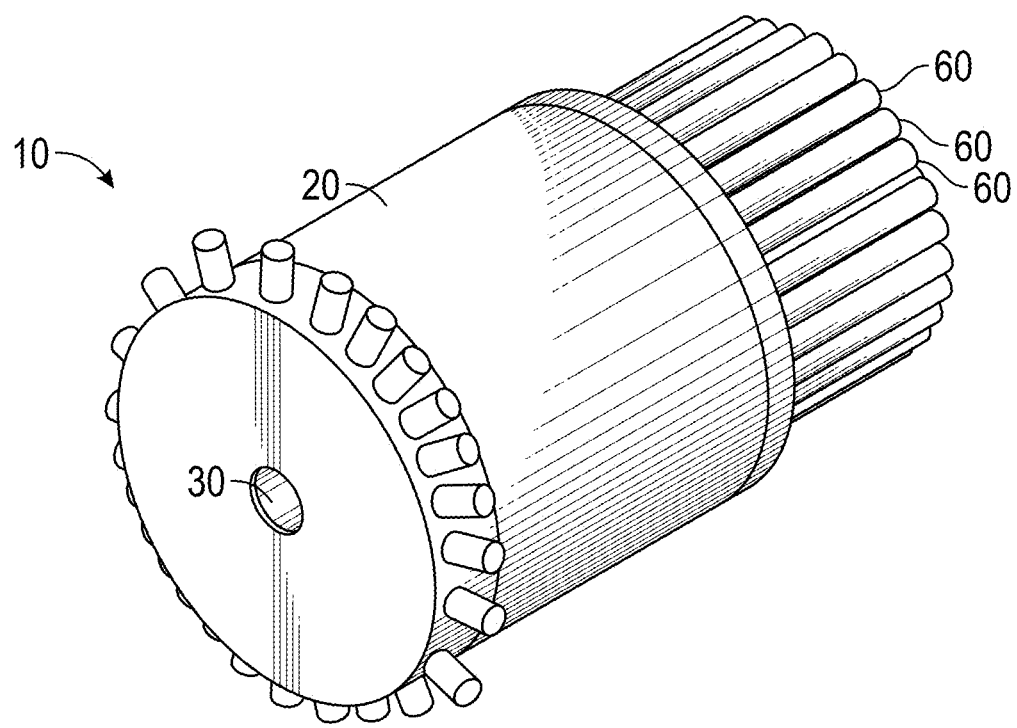
FIG. 5 is a depiction of an exemplary solar thermochemical reactor which includes a plurality of longitudinally oriented absorber tubes having at least one end which is vertically oriented.

Referring to FIG. 5, in an embodiment, the absorber tubes in the plurality of absorber tubes 60 each comprise an absorber tube body which is oriented at an angle other than 90° relative to the center line 50 of the reactor member 20. At least one end of the absorber tubes in the plurality of absorber tubes 60 is oriented at angle other than 0° relative to the center line 50 of the reactor member 20. The "at least one end" of the absorber tubes is the end that is closest to the aperture 30. In another embodiment, one or both ends of the absorber tubes in the plurality of absorber tubes 60 are oriented at an angle other than 0° relative to the center line of the reactor member 20. In an exemplary embodiment, the absorber tube body is oriented at an angle that is parallel or substantially parallel to the centerline 50 of the reactor member 20 and the one or both ends of the absorber tubes are perpendicular or substantially perpendicular to the centerline 50 of the reactor member 20. At least one advantage of this configuration is that the ends of the absorber tubes in the plurality of absorber tubes 60 are positioned such that they are disposed away from the hot reactor walls and the hot reactor tubes disposed within the reactor. This allows for sealing to be accomplished at lower temperatures, e.g., 200° C., at which the sealing material (e.g. silicone) avoids degradation.

Figure 6:
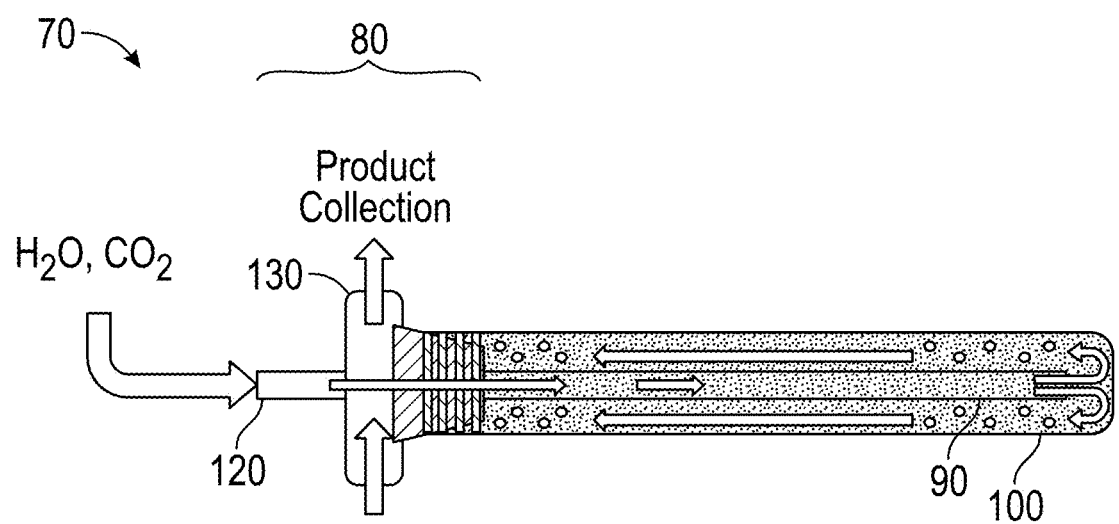
FIG. 6 is a cross-section view of an exemplary absorber tube which has a tube-within-a-tube assembly.

Referring to FIG. 6, an exemplary embodiment of an individual absorber tube 70 is shown having a tube-within-a-tube assembly with one end of the absorber tube 70 closed and the other end of the absorber tube 70 sealed with a seal assembly 80. The absorber tube 70 comprises an inner tube body 90 disposed within an outer tube body 100. The reactive material 110 is disposed within the outer tube body 100 of the tube absorber 70. The absorber tube 70 further comprises a material inlet 120 where reactants such as water ($H_2O$) and carbon dioxide ($CO_2$) are introduced into the absorber tube 70 and a material outlet 130 where thermochemical reaction products produced by the reactive material 110 in the absorber tube 70 are collected. As shown in FIG. 6, the material inlet 120 introduces materials into a channel the inner tube body 90 from which the materials flow into the reactive material 110 and a second channel in the outer tube body 100 of the absorber tube 70.

Figure 7:
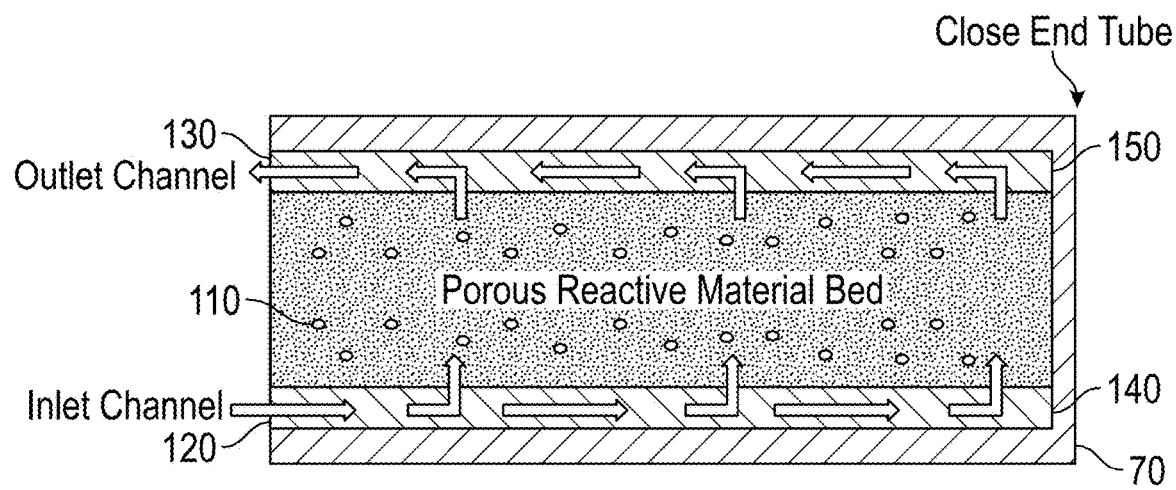
FIG. 7 is a cross-section view of a portion of an exemplary absorber tube which has a closed-end, an inlet channel and an outlet channel.

Referring to FIG. 7, in contrast to the tube-within-a-tube design shown in FIG. 6, the absorber tube 70 comprises a closed end absorber tube comprising a material inlet 120, a material outlet 130, a material inlet channel 140 and a material outlet channel 150. This absorber tube design allows for steam or other gas to penetrate the more of the reactive material bed faster than the tube-within-a-tube design. Instead of requiring that all of the inlet gas reach the end of the inner tube as in FIG. 6, this absorber tube design allows steam or other gas to flow through either a perforated tube or a porous channel through the porous reactive material 110. The steam or other inlet gas is then able to penetrate the reactive material 110, while the bulk or remainder of the inlet gas flow proceeds downstream toward the opposite end of the absorber tube 70. This absorber tube design allows for a reduction in pressure drop since gas flows through the porous reactive material 110 in the radial direction rather than along the entire length of the absorber tube 70. As reactant and product gases flow through the porous bed of reactive material 110, the products are collected in the material outlet channel 150. In addition, during the reduction step of the metal oxide redox cycle which occurs in the reactor 10, evolved oxygen is pumped away more quickly since it is pumped away radially rather than along the length of the reactive material bed in the absorber tube. This absorber tube design also promotes higher conductance during vacuum pumping.

Figure 8:
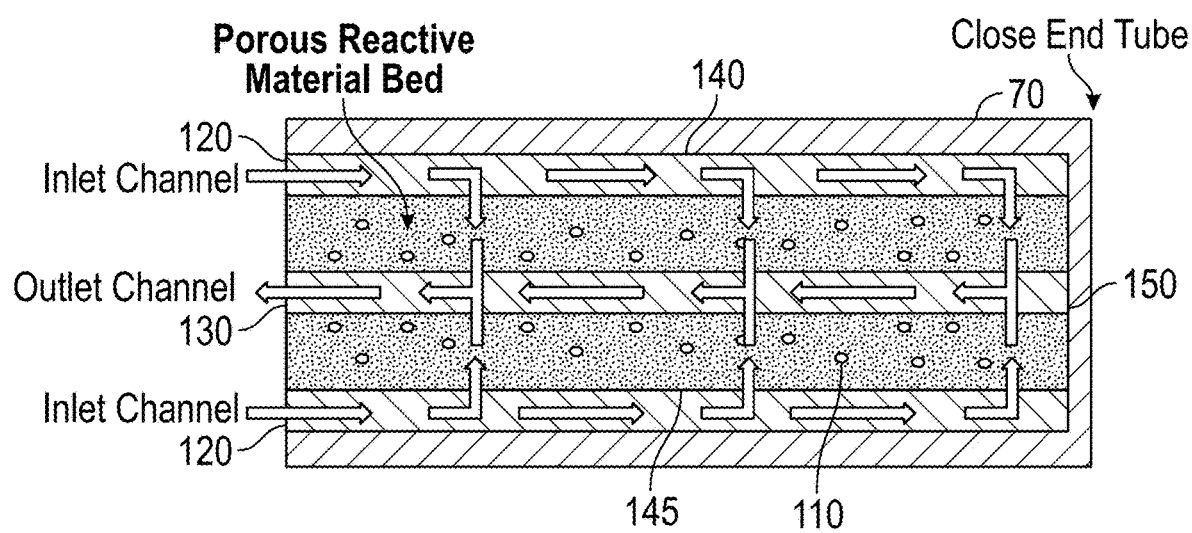
FIG. 8 is a cross-section view of a portion of an exemplary absorber tube which has a closed-end, a first inlet channel, a second inlet channel and an outlet channel.
Figure 9:
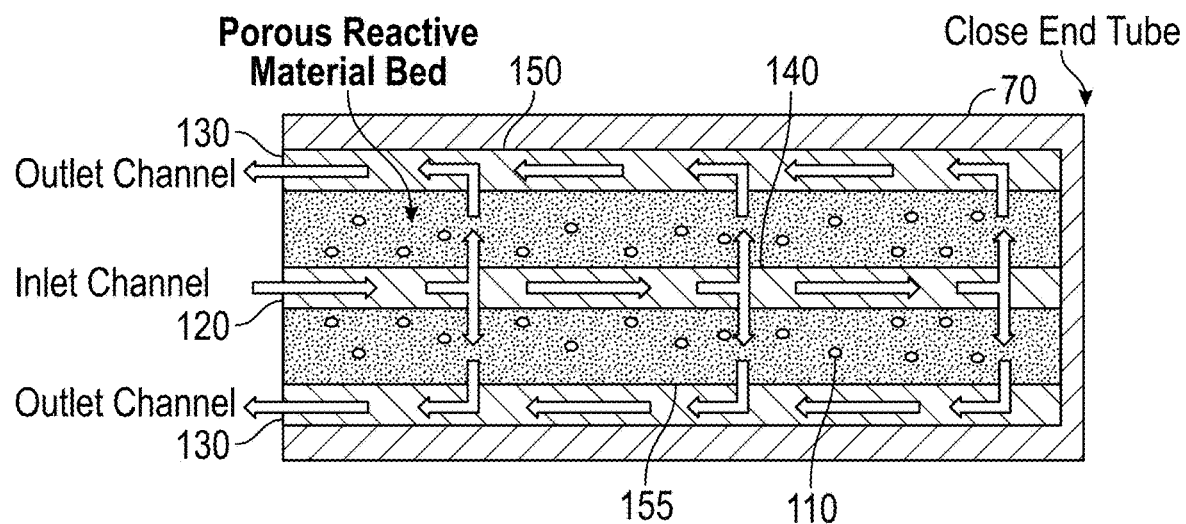
FIG. 9 is a cross-section view of a portion of an exemplary absorber tube which has a closed-end, an inlet channel, a first outlet channel and a second outlet channel.

As illustrated in FIGS. 8 and 9, in other embodiments the absorber tube 70 comprises one or more porous material inlet channels and one or more porous material outlet channels. The inlet and outlet channels are used to circulate materials in the reactor, e.g., to quickly distribute steam or carbon dioxide. Referring to FIG. 8, the absorber tube 70 comprises a series of three channels—a first inlet channel 140, a second inlet channel 145 and an outlet channel—150 which run through or surround the reactive material 110. Referring to FIG. 9, the absorber tube 70 comprises a series of three channels—an inlet channel 140, a first outlet channel 150 and a second outlet channel 155—which run through or surround the reactive material 110.

The plurality of absorber tubes 60 and the aperture 30 of the reactor 10 discussed above thus form a dual cavity design reactor, wherein the reactive material 110 is disposed in the plurality of absorber tubes 60 and incident solar radiation is received from the aperture 30. The use of an aperture 30 with the dual cavity design overcomes the structural weakness and efficiency problems associated with the use of optically transparent materials (e.g., glass, plastic, or combinations thereof) in windows in reactor systems. Accordingly, the reactor 10 has an aperture 30 which is devoid of an optically transparent material. In an embodiment, the aperture 30 comprises a media that has a refractive index of about 1.0 to about 1.05. In another embodiment, the aperture 30 comprises a media that has a density of about 0.90 to about 1.50 kg/m$^3$. In yet another embodiment, the aperture 30 comprises a fluid. In an exemplary embodiment, the aperture 30 comprises a fluid wherein the fluid is air.

Referring back to FIG. 4, in an embodiment, the reactive material 110 is not disposed in a tube but rather in a single outer cavity formed in the reactor member surrounding the aperture, or inner cavity. A series of channels are employed which run lengthwise through the reactive material 110 in the reactor member 20. Additional channels increase the rate of product transfer in the reactor 10. The number of channels employed is selected to account for decreased production due to volume substitution of the reactive material 110.

Figure 10:
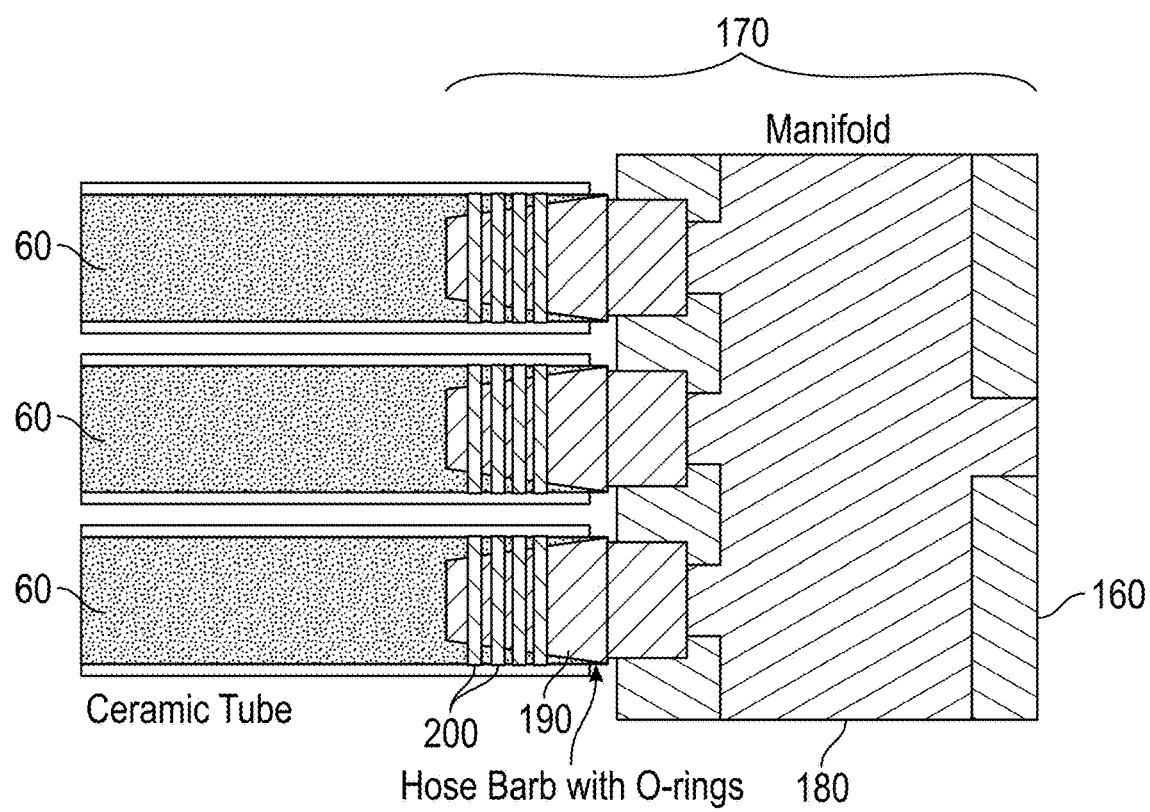
FIG. 10 is a cross-section view of a portion of an exemplary solar thermochemical reactor having an absorber tube seal assembly in which a plurality of absorber tubes are sealed using a manifold and hose barbs with O-rings.

In another exemplary embodiment, as depicted in FIG. 10, the reactor member 20 of the reactor 10 further comprises a front plate 160 which is detachable from a first end of the reactor member 20. When one end of the absorber tubes in the plurality of absorber tubes 60 is closed, a rear plate is not necessary. When both ends of the absorber tubes in the plurality of absorber tubes 60 are open, the reactor 10 further comprises a rear plate (not shown) which is detachable from a second end of the reactor member 20. The second end is opposed to the first end. The front plate 160, and the rear plate, if present, comprise a sealing assembly 170 which seals the plurality of absorber tubes 60. A manifold 180 is used to fixedly attach the sealing assembly 170 to the absorber tubes. Any material and/or shape may be used to form the sealing assembly 170. In one embodiment, the sealing assembly 170 comprises a hose barb 190 with one or more O-rings 200 attached thereto. In another embodiment, the sealing assembly 170 comprises a material joining of the absorber tube 70 material with a metal fitting (not shown). The material selected for the absorber tube 70 material and/or the metal fitting are any materials which are capable of withstanding the high temperatures of the solar thermochemical reactor 10. Non-limiting materials and methods of joining include, but are not limited to, metals, ceramics, alloys or a combination comprising at least one of the foregoing, and joining technology, brazing, welding and the like, or a combination comprising at least one of the foregoing.

The front plate 160 and/or rear plate are used to facilitate the loading of reactive materials into the plurality of absorber tubes 60 and unloading of spent reactive materials from the plurality of absorber tubes 60. The front plate 160 and/or rear plate are formed to fit on a first end or second end of the reactor member 10, covering the exposed end(s) of the absorber tubes while the aperture 30 remains exposed at least at one end of the reactor member 10. In an exemplary embodiment, the front plate 160 includes an opening for solar radiation to be received by the aperture 30.

In an embodiment, the sealing assembly 170, such as the hose barb with O-ring assembly depicted in FIG. 10, is configured to provide a self-guiding fit over the first and/or second end of the reactor member 10. In another embodiment, the front plate 160 and/or rear plate may comprise grooved seals (not shown) that form a self-aiding fit over the ends of the absorber tubes in the plurality of absorber tubes 60 in the reactor member 20.

In an embodiment, the reactor member 20 is used in conjunction with a vacuum pump to tightly seal the assembled parts of the reactor. The reactor 10 has a vacuum line (not shown) running from the reactor member 20 of the reactor 10 or from the front plate 160 to a vacuum pump (not shown). The vacuum pump is in fluid communication with the reactor 10. The vacuum pump may also be employed to maintain or control the pressure and/or temperature in the absorber tubes 60.

In an embodiment, the reactor 10 is used in conjunction with a sweep gas which may be used to maintain and/or control the pressure and/or temperature in the absorber tubes 60. Any inert gas which is capable of facilitating control of the pressure and/or temperature in the absorber tubes in the plurality of absorber tubes 60 may be employed. Non-limiting examples of such a sweep gas include argon gas (Ar) and nitrogen gas ($N_2$). In one embodiment, the sweep gas is employed to maintain and/or control the pressure and/or temperature in the absorber tubes in the plurality of absorber tubes 60 during the reduction step of the thermochemical reaction, as discussed further below. In another embodiment, a vacuum pump and/or a sweep gas is used to maintain or control the pressure and/or temperature in the plurality of absorber tubes 60. In yet another embodiment, a vacuum pump is employed to maintain or control the pressure and/or temperature in the plurality of absorber tubes 60 during the reduction step, without the use of a sweep gas.

In an embodiment, the reactor member 20 further comprises a shutter 210 which exposes or covers the aperture 30 in the reactor member 20 for receiving solar radiation as desired. The shutter 210 can be seen in FIG. 4. The shutter 210 is optionally attached to the reactor member 20. In one embodiment, the shutter 210 has its own support and activation mechanism (not shown). When the shutter 210 is open, solar radiation is permitted to enter into the aperture 30 and the reactor 10, thereby producing heat. When the shutter 210 is closed, solar radiation is prevented from entering the reactor 10, and the heat inside the reactor is conserved while re-radiation is prevented. The use of the shutter 210 in open and closed modes promotes the efficiency of the thermochemical reactions carried out in the reactor 10. No external heating is used to carry out the thermochemical reactions in the reactor 10. In an embodiment, the solar radiation which the aperture 30 receives is in the form of concentrated radiation.

Referring back to FIGS. 1-10, the reactor member 20, the plurality of absorber tubes 60, the front plate 160 and optional rear plate are made of any material which is capable of withstanding the temperatures used to carry out thermochemical reactions in the reactor 10. Exemplary materials include refractory materials, specifically ceramics, more specifically zirconia, silicon carbide, zinc and alumina oxides or mixtures thereof. In an embodiment, the front plate 160 and/or optional rear plate comprises grooved seals, specifically, metal enforced grooved seals, and more specifically graphite metal enforced seals, to fit over the first and/or second end of the reactor member 20.

In an embodiment, the absorber tubes in the plurality of absorber tubes 60 are made from ceramics, metal or other high-temperature materials. Non-limiting examples of such materials include aluminum oxide, zirconium oxide, silicon carbide, graphite, sapphire, tungsten, titanium and the like, or a combination comprising at least one of the foregoing. In another embodiment, the plurality of absorber tubes 60 further comprise a coating disposed on the interior of each of the absorber tubes which prevents chemical reaction of the absorber tube material with the reactive material 110. In an exemplary embodiment, the absorber tubes in the plurality of absorber tube 60 are made from silicon carbide and are each coated with alumina, molybdenum, or the like, or a combination comprising at least one of the foregoing.

The dual cavity design of the reactor 10 maximizes the effective absorbance of solar radiation in the reactor 10 and minimizes re-radiation losses. The use of a vacuum reduces the temperatures used to carry out thermochemical reduction reactions in the solar thermochemical reactor 10.

In an embodiment, as depicted in a cross section of the reactor assembly shown in FIG. 4, the reactor member 20 of the reactor 10 further comprises an insulating material 220. The insulating material 220 may be internal or external to the reactor member 20. The insulating material 220 may partially or completely surround the circumference or outer surface of the reactor 10. The insulating material 220 is any material which is capable of imparting insulation at high temperatures equal to or greater than about 1700° C. and/or imparting low thermal conductivity insulation. In another embodiment, the insulating material 220 comprises two or more layers of the same or different insulating material.

In still another embodiment, the reactor further comprises a radiation shield (not shown). The radiation shield utilizes spectral reflection to limit radiation losses. The radiation shield may be used separately from or in conjunction with the insulating material 220. Any materials which impart radiation shielding may be employed. A non-limiting example of a radiation shield comprises a first thin layer of metal and a second thin layer of metal, the void between which is filled with a gas which circulates by either active or passive convection in order to heat inlet gases or generating steam.

In an exemplary embodiment, the insulating material comprises a layer of high temperature insulating material disposed directly on or in close proximity to the reactor 10, followed by a radiation shield disposed over or in close proximity to the high temperature insulating material or a portion thereof, followed by a low thermal conductivity insulating material disposed over or in close proximity to the high temperature insulating material or a portion thereof.

The reactor member 20 also comprises an optional magnetic coil 230. In an embodiment, the magnetic coil 230 is affixed or disposed externally to or within at least part of the reactor member 20 or disposed externally to the reactor member 20. In another embodiment, the magnetic coil 230 is physically separate from the reactor member 20 and placed in a position external and adjacent to the reactor member 20. Affixing or disposing the insulating material 220 and magnetic coil 230 so as to form part of the reactor member 20 of the reactor 10 is desirable for commercial packaging and efficiency of use. The magnetic coil 230 is used to apply a magnetic field to the reactor member 20 and thereby magnetically stabilizes the reactor material 110 inside the plurality of absorber tubes 60 within the reactor member 20.

The following section is directed to reactor materials that may be used in the plurality of absorber tubes 60.

The reactor material 110 is any material which is suitable to carry out solar thermochemical reactions in the reactor 10. In one embodiment, the reactive material may comprise material which is or is not capable of being magnetically stabilized. Structures may be formed using the reactor material 110 and such magnetic stabilization.

Porous Carbonaceous Materials

In another embodiment, the reactive material 110 is a sacrificial carbon pore formed structure. The sacrificial carbon pore formed structure is formed using sacrificial pore formation, in which a sacrificial pore former is used to create voids in the reactor material 110. Pore formers include, but are not limited to, graphite, activated carbon, other metals, metal oxides, polymers and the like, or a combination comprising at least one of the foregoing.

Thermochemically Stabilized Porous Structure (TSPS)

In yet another embodiment, the reactor material 110 is a thermochemically stabilized porous structure (TSPS).

Exemplary reactor materials 110 include, but are not limited to, cobalt ferrite ($COFe_2O_4$), magnetite ($Fe_3O_4$), mixed metal ferrites ($MFe_2O_4$), ceria ($CeO_2$), perovskite materials in the form of $ABO_3$ where A and B are each different metals, or a combination of any of the above materials with an inert material, such as, but not limited to zirconia ($ZrO_2$), yttria-stabilized zirconia (YSZ), alumina ($Al_2O_3$) and magnesium oxide, and the like or a combination comprising at least one of the foregoing.

Monolithic Fused Magnetically Oriented Particles

In one embodiment, the reactor material 110 comprises particles which are capable of becoming magnetically oriented and stabilized. Exemplary materials are described in detail in U.S. Patent Application No. 61/505,890 filed on Jul. 8, 2011, which is incorporated by reference in its entirety herein.

In an embodiment, the reactor material 110 comprises a monolithic solid that contains fused magnetic particles or magnetically susceptible particles that have been oriented by a magnetic field during the process of fusing the particles together. In another embodiment, the reactor material 110 may comprise a monolithic solid that contains fused electrically conductive particles that are oriented in an electrical field during the process of fusing the particles together. The monolithic solid of this embodiment is porous, has a high surface area and can be used in lieu of a fluidized bed or in addition to a fluidized bed to conduct reactions. The chains of particles comprise a series of particles that are bonded to each other to appear chain-like. The particles in a chain are bonded to each other in such a manner that a magnetic north pole of one particle contacts a magnetic south pole of at least one neighboring particle.

In another embodiment, the reactor material 110 comprises a monolithic solid that comprises chains of a first particle that is magnetic or that can be influenced by a magnetic field, an electrical field or a combination of magnetic fields and electrical fields and a second particle that is non-magnetic and that cannot be influenced by a magnetic field and/or an electrical field. The monolithic solid of this embodiment is also porous, has a high surface area and can be used in lieu of a fluidized bed or in addition to a fluidized bed to conduct reactions. The particles in a chain are bonded to each other in such a manner that a magnetic north pole of one particle contacts a magnetic south pole of at least one neighboring particle. The non-magnetic particles may be fused to the magnetic particles in a chain. In an embodiment, the non-magnetic particles may be trapped between chains of fused magnetic particles without being bonded to the magnetic particles. The chains of particles in the monolithic solid are formed by sintering the particles at an elevated temperature whilst in a flow field under the simultaneous influence of a magnetic field. The monolithic solid of this embodiment can also comprise gradients in first and second particle composition, size, and/or density.

While this disclosure has described first and second particles, there can be a plurality of different first particles (i.e., first particles having different chemical compositions) or a plurality of different second particles. For example, the first particles which are susceptible to a magnetic field can comprise one group of iron particles, another group of nickel particles, and so on. Similarly, for example, the second particles which are non-magnetic particles can comprise one group of silica particles, a second group of polymer particles, and so on.

The monolithic solid thus formed has a high surface area and can be used to conduct chemical reactions at elevated temperatures. In an exemplary embodiment, the monolithic solid can be used in a hydrogen production looping process. The hydrogen production rate from this monolithic structure is improved significantly especially when compared with a standard fluidized bed, where the particles are free flowing.

The monolithic solid can be further subjected to an elevated temperature in the presence of a reactive gas (e.g., a carbonaceous gas) to grow carbon nanotubes in the interstices of the monolithic solid. Alternatively, other nanorods, nanowires or nanoparticles can also be grown in the interstices of the monolithic solid to increase the surface area. The presence of the nanorods, nanowires, nanoparticles or carbon nanotubes further increases the surface area of the monolithic solid, thereby increasing the productivity rate when reactions are conducted on the monolithic solid. A monolithic solid comprising chains of magnetic particles (or magnetically susceptible particles) having nanowires and the like protruding from the chains is also envisioned as being a reactor material 110. In this embodiment, carbon nanotubes, nanorods, nanowires or nanoparticles can also be grown in the interstices of the monolithic solid.

The first particles are either magnetic particles or particles that can be influenced by a magnetic field. Magnetic particles are those that respond at an atomic or subatomic level to an applied magnetic field that is greater than the earth's magnetic field. For example, one form of magnetic particles can be ferromagnetic particles that produce their own persistent magnetic field. Magnetic particles are those that are attracted to a magnetic field (via paramagnetism); others are repulsed by a magnetic field (via diamagnetism); others have a much more complex relationship with an applied magnetic field. Non-magnetic particles are those that are negligibly affected by magnetic fields. The magnetic state (or phase) of a material depends on temperature (and other variables such as pressure and applied magnetic field) so that a material may exhibit more than one form of magnetism depending on its temperature.

Magnetic particles include iron, nickel, cobalt, ferrites, rare earth magnets or alloys thereof. In an embodiment, the magnetic particles comprise iron, cobalt, nickel or a combination comprising at least one of iron, cobalt or nickel. Examples of alloy magnets that may be used as magnetic particles in the monolithic solid are Alnico (a magnet alloy that comprises aluminum, iron, cobalt and nickel), samarium cobalt (SmCo) and neodymium iron boron (NdFeB), $FeOFe_2O_3$, $NiOFe_2O_3$, $CuOFe_2O_3$, $MgOFe_2O_3$, MnBi, MnSb, $MnOFe_2O$, or the like, or a combination comprising at least one of the foregoing magnetic particles. Alloys that include a combination of magnetic particles and non-magnetic particles may also be used. The non-magnetic portion present in the alloys may be metals, ceramics, or polymers. Exemplary magnetic particles are iron particles.

The first particles can be present in the form of rods, tubes, whiskers, fibers, platelets, spheres, cubes, or the like, or other geometrical forms. Aggregates and agglomerates of the first particles are also included. They can have average dimensions in the nanometer range or in the micrometer range. The nanometer range generally includes particle sizes of less than or equal to about 100 nanometers, while the micrometer range generally includes particle sizes of 100 nanometers or greater.

The first particles generally have an average particle size of about 40 to about 100 micrometers, preferably about 75 to about 90 micrometers. The average particle size is measured in terms of a diameter of gyration.

The first particles are present in an amount of about 5 to about 100 wt %, specifically about 10 to about 90 wt %, and more specifically about 20 to about 50 wt %, of the total number of first particles and second particles introduced into the reactor.

The second particles that are non-magnetic and that cannot be magnetized can include inorganic oxides, carbides, oxycarbides, nitrides, oxynitrides, borides, activatable carbon, or the like, or a combination comprising at least one of the foregoing. It is desirable for the second particles to be electrically insulating. Electrically insulating particles generally have a bulk volume resistivity that is greater than about $1 \times 10^{11}$ ohm-cm. Exemplary second particles are silicon dioxide particles.

The second particles generally have an average particle size of about 20 to about 100 micrometers, preferably about 50 to about 75 micrometers. The average particle size is measured in terms of a diameter of gyration.

The second particles are present in an amount of about 0 to about 95 wt %, specifically about 90 to about 10 wt %, and more specifically about 80 to about 50 wt %, of the total number of first particles and second particles introduced into the reactor.

The first particles can also be influenced by an electrical field. These first particles are electrically active. They can be ferroelectric or, made from an electrically conducting material coated with an insulator, or electro-osmotically active particles. In the case of ferroelectric or conducting material, the particles would have a high dielectric constant. Examples of such materials are metal nanorods (e.g., aluminum) or nanotubes coated with a polymer, urea coated nanoparticles of barium titanium oxalate, carbon nanotubes, or the like, or a combination comprising at least one of the foregoing particles.

In another embodiment, the first particles of the monolithic solid can be suspended in a magnetorheological fluid or an electrorheological fluid during the fusing process. Suitable magnetorheological fluids include ferromagnetic or paramagnetic first particles dispersed in a carrier fluid. Suitable first particles that can be disposed in magnetorheological fluids include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; or the like, or a combination comprising at least one of the foregoing particles. Examples of suitable iron particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

Suitable carrier fluids for the MR fluid composition include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

Magnetic Materials that are not Magnetically or Electrically Oriented

In another embodiment, the reactor materials may not be in the form of a magnetic solid that has been fused via sintering in the presence of a magnetic field. Such reactor materials may be in the form of porous solids or powders. Specifically, exemplary reactor materials 110 include metals and metal oxides such as iron, iron oxides or mixtures thereof. More specifically, exemplary reactor materials 110 are selected from the group consisting of $Fe_2O_3$, $Fe_3O_4$, and $NiFe_2O_4$ or a combination including at least one of the foregoing. In an embodiment, the metal oxide reactor materials 110 are non-volatile. Non-volatile metal oxides, when used solar thermochemical reactions, avoid undesirable properties associated with volatile metal oxides associated with rapid quenching.

Composite Materials for Use as a Reactor Material

In yet another embodiment, a composite material for use as the reactor material 110 comprises a first non-metallic particle in which is dispersed a second non-metallic particle, where the first non-metallic particle and the second non-metallic particle are inorganic; and where a chemical composition of the first non-metallic particle is different from a chemical composition of the second non-metallic particle. In an embodiment, the first non-metallic particle contains a dispersion of the second non-metallic particle. The first non-metallic particles are therefore larger in size than the second non-metallic particles. The composite material may further comprise a third non-metallic derivative that stabilizes the first non-metallic particle and the second non-metallic particle against further sintering.

The first non-metallic particles are immiscible or partially miscible with the second non-metallic particles. The first non-metallic particles melt at lower temperatures than the second non-metallic particles. The first non-metallic particles have a number average particle size that is at least 3 times greater, specifically at least 15 times greater, and more specifically at least 20 times greater than the number average particle size of the second non-metallic particles. The number average particle size is the radius of gyration of the particles and can be determined by small angle light scattering, scanning electron microscopy, or visible light microscopy.

Prior to mixing, the first non-metallic particles are larger in size than the second non-metallic particles and preferably melt at lower temperatures than the second non-metallic particles. The first non-metallic particles can be oxides, carbides, nitrides, borides, silicides of metals such as iron, cobalt, manganese and/or copper. Exemplary first non-metallic particles comprise magnetite ($Fe_3O_4$).

It is desirable for the average particle size of the first non-metallic particles to be about 20 to about 80 micrometers, specifically about 30 to about 70 micrometers, and more specifically about 35 to about 65 micrometers. In an exemplary embodiment, when the first non-metallic particles comprise magnetite, the average particle size is about 25 to about 60 micrometers, specifically about 30 to about 55 micrometers, and more specifically about 40 to 50 micrometers. An exemplary particle size is 44 micrometers.

The first non-metallic particles are generally present in the mixture prior to sintering in amounts of about 2 to about 20 wt %, specifically about 3 to about 17 wt %, and more specifically about 4 to about 15 wt %, based on the total weight of the first non-metallic particles and the second non-metallic particles.

The secondary non-metallic particles are smaller in size than the first non-metallic particles and preferably melt at higher temperatures than the first non-metallic particles. The second non-metallic particles can be oxides, carbides, nitrides, borides, silicides of metals such as zirconium, titanium, aluminum, silicon and/or cerium. Exemplary second non-metallic particles comprise zirconia (ZrO2).

It is desirable for the average particle size of the second non-metallic particles to be about 0.5 to about 10 micrometers, specifically about 1 to about 8 micrometers, and more specifically about 1.5 to about 6 micrometers. In an exemplary embodiment, when the second non-metallic particles comprise zirconia, the average particle size is about 0.5 to about 6 micrometers, specifically about 1.0 to about 4 micrometers, and more specifically about 1.5 to 3 micrometers. An exemplary particle size is 2 micrometers.

The second non-metallic particles are generally present in the mixture prior to sintering in amounts of about 80 to about 98 wt %, specifically about 83 to about 97 wt %, and more specifically about 85 to about 95 wt %, based on the total weight of the first non-metallic particles and the second non-metallic particles.

The weight ratio of the first non-metallic particles and the second non-metallic particles present in the mixture prior to sintering is about 1:4 to about 1:6, specifically about 1:4.2 to about 1:5, and more specifically about 1:4.3 to about 1:4.5. In one exemplary embodiment, when the first non-metallic particle is magnetite and the second non-metallic particle is zirconia, the weight ratio is 1:4.4.

In summary, the composite material for use as a reactor material 110 comprises first non-metallic particles in which are dispersed second non-metallic particles. The first non-metallic particle and the second non-metallic particle are metal oxides, metal carbides, metal nitrides, metal borides, metal silicides, metal oxycarbides, metal oxynitrides, metal boronitrides, metal carbonitrides, metal borocarbides, or a combination thereof. The composite material comprises composite particles that have an average particle size of about 200 to about 2000 micrometers. In the composite material, the first non-metallic particle has an average particle size of about 20 to about 80 micrometers and the second non-metallic particle has an average particle size of about 0.5 to about 10 micrometers prior to a sintering. A weight ratio of the first non-metallic particle to the second non-metallic particle is about 1:4 to about 1:6.

In an exemplary embodiment in the composite material, the first non-metallic particle comprises magnetite, while the second non-metallic particle comprises zirconia.

Activated Carbon

Activated carbon may also be used in the reactor bed material as detailed below. Activated carbon is also called activated charcoal or activated coal and is a form of carbon that is riddled with small, low-volume pores that increase the surface area available for adsorption or chemical reactions. The activated carbon is mixed into ferrite powder and oxidized using either air or steam to form the reactor bed material. During the oxidation, the activated carbon is converted from a solid to a gas, i.e., from carbon to carbon dioxide. Since the activated carbon is all converted to carbon dioxide during the oxidation, the resulting reactor bed material contains only the oxidized porous ferrite powder. Nonvolatile metal oxides, when used in solar thermochemical reactions, avoid undesirable properties associated with volatile metal oxides associated with rapid quenching.

Combinations of one or more the foregoing particles may be used.

The reactor materials 110 form a bed of reactor materials within the absorber tubes in the plurality of absorber tubes 60. The bed of reactor materials is then fluidized. When a magnetic field is applied to the reactor member 20, and solar radiation is disposed upon the aperture 30, the temperature is elevated, and the bed of reactor materials 110 becomes magnetically stabilized. Iron powder sinters at 550° C. when oxidized. Therefore, the magnetically stabilized bed is sintered at a relatively low temperature. This results in sintering of the reactor materials 110 into a state in which the surface area is not substantially reduced. The exposure to a magnetic field has the effect of freezing the reactor materials 110 into a structure with a high surface area. The particle chains within the reactor materials 110 repel each other due to the magnetic force, creating a high surface area structure with high porosity which can withstand exposure to relatively high temperatures during the first reduction reaction of the redox cycle. In an embodiment, the magnetic field is only used during synthesis of the magnetically stabilized bed structure prior to the first reduction reaction carried out in the solar reactor using the reactor materials 110. The magnetically stabilized bed of reactor material 110 can overcome the sintering problems associated with other reactive materials which become sintered such that the surface area is reduced, and therefore undergo favorable chemical kinetics during reactor cycles. Accordingly, the reactor materials 110 disclosed herein avoid deactivation due to undesirable sintering and are capable of being used for many repeated reaction cycles in the reactor 10 without requiring new reactor materials to be loaded into the reactor.

The dual cavity design and absorber tube configuration of the reactor 10 and magnetically stabilized reactor materials 110 used therein are used at relatively low pressures, thereby overcoming the challenges of other reactor systems which use high temperatures and high pressures. The reaction temperatures in the reduction reaction are lowered by lowering the partial pressure of the oxygen evolving as a result of the reaction. The low pressure utilized also allows for lower temperature conditions for carrying out the reduction reaction in the reactor 10. In an exemplary embodiment, the dual cavity solar thermochemical reactor 10 is operated at partial oxygen pressures of less than about $10^{-4}$ bar, specifically less than $10^{-3}$ bar, and more specifically less than $5 \times 10^{-4}$ bar to facilitate the disassociation of the metal in the reactor material 110. In another exemplary embodiment, the dual cavity solar thermochemical reactor may be operated at temperatures of less than 1500° C., specifically less than 1500° C., and more specifically less than 1450° C. In another embodiment, the dual cavity design of the reactor 10 has a low thermal mass and is equipped with a control system to control irradiation in order to cope with transient periods of availability of solar radiation. In addition, waste heat from the reactor discharge gases are recouped, and transferred to the inlet reactants, $H_2O$ and $CO_2$, to increase energy conversion efficiency.

Fracturing, caused by matrix mismatch or spallation of the metal oxide reactor material 110 is controlled by controlling the growth conditions, specifically the film thickness and/or rate of growth. In another embodiment, short duration redox cycles are used to avoid spallation and fracture. In yet another embodiment, use of a magnetically stabilized fluidized bed of reactor materials 110 avoids fracturing and spallation.

Disclosed herein too is a method of using a solar thermochemical reactor comprising disposing a plurality of absorber tubes within a reactor member, wherein the absorber tubes are oriented such that their respective centerlines are at an angle other than 90° relative to the centerline of the reactor member, and wherein the reactor member has an aperture for receiving solar radiation, the aperture being disposed in a plane on a wall of the reactor member, where the plane is oriented at any angle other than parallel relative to the centerline of the reactor member; the plurality of absorber tubes and the aperture having a hydraulic diameter that is from 0.2 to 4 times a hydraulic diameter of at least one absorber tube in the plurality of absorber tubes, disposing a reactive material in the absorber tubes, applying a vacuum to the reactor member, fluidizing the reactive material, disposing solar radiation onto the reactor member, carrying out a reduction reaction in the reactor, extracting oxygen from the reactor, disposing carbon dioxide and water onto the reactor material, carrying out an oxidation reaction in the reactor and extracting carbon monoxide gas and hydrogen gas from the reactor.

The reactor 10 is used to perform thermochemical redox reactions. A complete solar thermochemical reactor redox cycle comprises a reduction reaction and an oxidation reaction to produce syngas. The resulting syngas is then stored or further refined into fuels for commercial use. In reduction mode, the reactor 10 uses concentrated solar radiation to produce heat and elevate the temperature of the reactor 10. The reactive material 110 undergoes reduction at low pressure to produce oxygen ($O_2$), which is extracted from the reactor via the material inlet 120. During the reduction step, the reactor material 110, or metal oxide, undergoes disassociation wherein metal is dissociated from the metal oxide.

Specifically, exemplary reduction reactions are represented by the following chemical equations:

$$Fe_3O_4 + \text{solar heat} \rightarrow 3FeO + 0.5O_2$$

$$Fe_2O_3 + \text{solar heat} \rightarrow 2FeO + 0.5O_2$$

$$NiFe_2O_4 + \text{solar heat} \rightarrow NiFe_2O_3 + 0.5O_2$$

In an embodiment, the reduction of reactive material in the solar thermochemical reactor 10 results in reduction to iron, although this is less probable than the equations represented above, and is represented by the following exemplary chemical equation:

$$Fe_3O_4 + \text{solar heat} \rightarrow 3Fe + 2O_2$$

In an exemplary embodiment, reactive material 110 is disposed in the plurality of absorber tubes 60 within the reactor member 20 of the reactor 10. A vacuum is applied to the reactor 10 creating a fitted seal between the reactor member 20, the plurality of absorber tubes 60 and the front plate 160, aided by the hose barbs 190 with O-rings 200. The reactive material 110 is then fluidized. A magnetic field is applied to the bed of reactive material 110 via the magnetic coil 230, magnetically stabilizing the reactive material 110. The shutter 210 is opened, allowing concentrated solar radiation to be received into the reactor through the aperture 30. The magnetic field is then turned off. The concentrated radiation produces heat, elevating the temperature in the reactor 10 to sinter the reactor materials 110 and to drive the reduction reaction. The magnetically stabilized, sintered reactive material 110 undergoes reduction to produce oxygen gas, which is extracted from the reactor via the material outlet 130.

After the thermochemical reduction reaction is complete, the shutter 210 is closed, preventing solar radiation from entering the aperture 30 of the reactor member 20. The reactor 10 is then used to carry out a thermochemical oxidation reaction in oxidation mode. The closed shutter 210 allows heat generated in the reactor to be retained and helps to minimize radiation loss.

In an exemplary embodiment, in oxidation mode, water ($H_2O$) and carbon dioxide ($CO_2$) are introduced into the reactor 10 via the material inlet 120 to oxidize the magnetically stabilized bed of reactive material 110. The reactive material 110 undergoes oxidation at atmospheric pressure to produce carbon monoxide and hydrogen gases, or syngas, which is extracted from the reactor via the material outlet 130. The heat produced from the exothermic oxidation reaction is sufficient to maintain the temperature.

Specifically, exemplary oxidation reactions are represented by the following chemical equations:

$$3FeO + H_2O + CO_2 \rightarrow Fe_3O_4 + H_2 + CO$$

$$2FeO + H_2O + CO_2 \rightarrow Fe_2O_3 + H_2 + CO$$

$$3Fe + 4H_2O + CO_2 \rightarrow Fe_3O_4 + 4H_2 + CO$$

$$2NiFe_2O_3 + H_2O + CO_2 \rightarrow 2NiFe_2O_4 + H_2 + CO$$

The thermochemical reduction reaction and oxidation reaction together constitute a single redox cycle. The resulting syngas is refined into fuel for commercial use or stored for later refinement. In an embodiment, the magnetically stabilized bed material is used for many cycles, specifically many hundred cycles, and more specifically thousands of cycles, before being replaced. In another embodiment, the redox reactions are carried out in short duration cycles. For example, a complete redox cycle is carried out in about one hour, more specifically in about 15 minutes.

Figure 11:
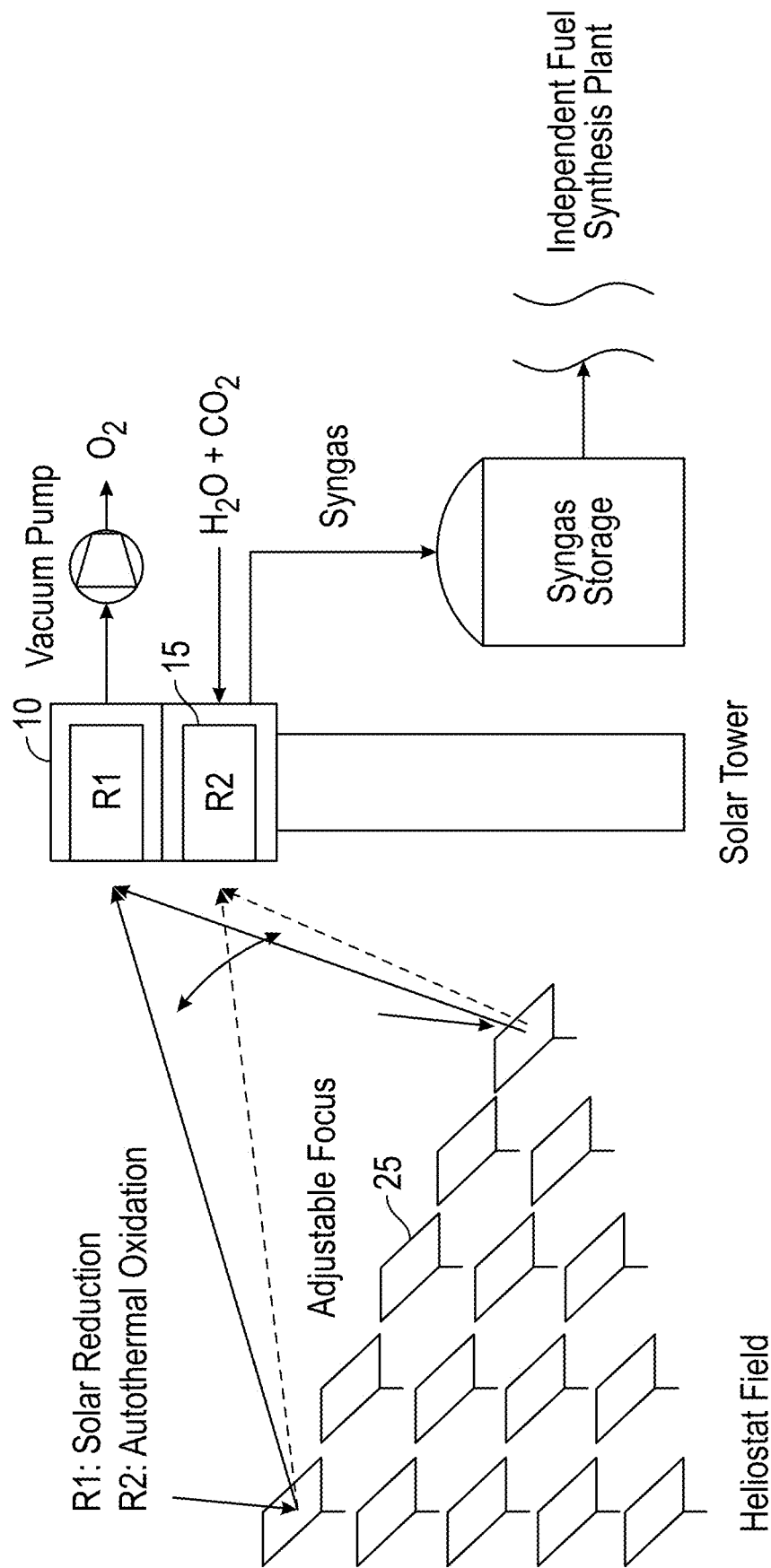
FIG. 11 is a depiction of an exemplary cyclic looping process using two solar thermochemical reactors in close proximity to one another.

In yet another exemplary embodiment, a looping process is provided as depicted in FIG. 11. As shown in FIG. 11, a first solar thermochemical reactor 10 is disposed in close proximity to a second solar thermochemical reactor 15. Concentrated radiation, such as that from an adjustable heliostat field 25, is focused onto the first reactor 10 wherein the shutter is open. A reduction reaction as described above is carried out and once completed, the shutter is closed, allowing the oxidation reaction to produce syngas to proceed. Once the reduction reaction in the first reactor 10 is completed, and while the oxidation reaction is being carried out in the first reactor 10, the concentrated solar radiation is refocused onto the second reactor 15, which similarly undergoes a reduction reaction. Once the reduction reaction in the second reactor 15 is completed, the concentrated solar radiation is again refocused from the heliostat 25 onto the first reactor 10, and the looping process begins again. The looping process maximizes efficiency by increasing the use of available solar radiation during the redox cycle. This looping process uses two or more reactors located in close proximity to each other. The looping process is repeated over and over, thus minimizing downtime during periods when solar radiation is available between redox cycles. The looping process overcomes the challenges associated with the cyclical and transient nature of solar thermochemical reactor operation.

Two or more reactors in close proximity to one another are used in the looping process. In one embodiment, at least two reactors are disposed side-by-side. In another embodiment, at least one reactor is disposed on top of at least one other reactor. In another embodiment, the shifting of the solar radiation onto to reactor is accomplished by shifting a heliostat to move the concentrated solar radiation from one reactor to another. In another embodiment, two or more reactors are disposed upon a rotating reactor assembly which refocuses concentrated solar radiation from one reactor to another. In yet another embodiment, a beam-redirected mirror is used to refocus concentrated solar radiation from one reactor to another.

In an exemplary embodiment, a solar reactor having a dual cavity design as described above has an aperture 30 that does not include an optically transparent material, operates at a relatively a low pressure and temperature to carry out the metal dissociation reduction step, and magnetically stabilized reactor materials are sintered in a controlled manner to avoid undesirable sintering and deactivation of the metal reactor materials.

Figure 12:
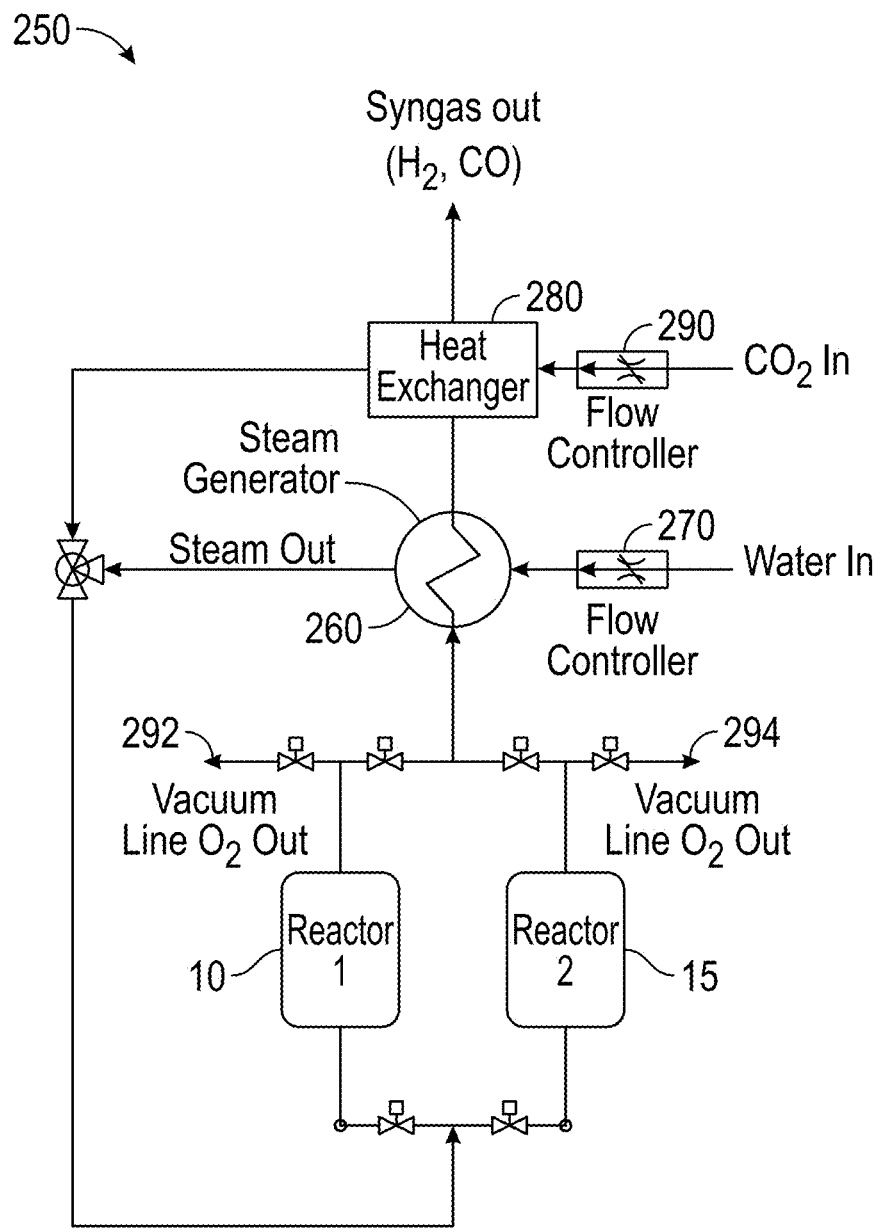
FIG. 12 is a depiction of an exemplary reactor setup.

In another embodiment, as depicted in FIG. 12, a reactor system 250 is equipped with means to automatically carry out the redox cycles. The reactor system 250 comprises a first solar thermochemical reactor 10 disposed in close proximity and in fluid communication with a second solar thermochemical reactor 15. A steam generator 260 is disposed upstream from and in fluid communication with the first solar thermochemical reactor 10 and the second solar thermochemical reactor 15. A first controller 270 is disposed upstream of the steam generator 260 from which water is supplied. The first controller 270 controls the flow rate of water supplied to the steam generator 260. In an embodiment, the flow rate of the water entering the steam generator 260 is from about 0.1 g $H_2O$ $min^{-1}$ to about 50 g $H_2O$ $min^{-1}$. The steam generator 260 elevates the temperature of the water supplied by the first controller 270 to generate steam. The temperature in the steam generator 260 which is used to convert water to steam is from about 200° C. to about 500° C. The steam is then supplied from the steam generator 260 to the first solar thermochemical reactor 10 and the second solar thermochemical reactor 15 for use in the redox cycle reactions carried out therein.

The reactor system 250 further comprises a heat exchanger 280 disposed upstream from and in fluid communication with the first solar thermochemical reactor 10 and the second solar thermochemical reactor 15. A second controller 290 is disposed upstream of the heat exchanger 280 from which carbon dioxide is supplied. The second controller 290 controls the flow rate of carbon dioxide supplied to the heat exchanger 280. In an embodiment, the flow rate of the carbon dioxide entering the heat exchanger 280 is from about 0.1 g $H_2O$ $min^{-1}$ to about 50 g $H_2O$ $min^{-1}$. The heat exchanger 280 elevates the temperature of the carbon dioxide supplied from second controller 290. The temperature in the heat exchanger 280 which is used to elevate the temperature of the carbon dioxide is from about 25° C. to about 400° C. The carbon dioxide is then supplied from the heat exchanger 280 to the first solar thermochemical reactor 10 and the second solar thermochemical reactor 15 for use in the redox cycle reactions carried out therein.

The reactor system 250 further comprises means for heat recuperation. A first vacuum pump 292 and a second vacuum pump 294 are disposed downstream of and in fluid communication with the first solar thermochemical reactor 10 and the second solar thermochemical reactor 15. The first vacuum pump 292 and second vacuum pump 294 remove oxygen produced from the redox cycle reactions which occur in the reactors. Heat generated from the redox cycle reactions carried out in the first solar thermochemical reactor 10 and the second solar thermochemical reactor 15, and the hydrogen and carbon monoxide reaction products, are supplied to the steam generator 260 where the heat is used to generate steam from water. The heat is supplied from the steam generator 260 to the heat exchanger 280 where the heat is used to elevate the temperature of the carbon dioxide reaction product and the reaction products are collected. In another embodiment, the reactor system 250 also includes other heat recuperation technology.

The reactor 10 may also be easily maintained and repaired due to the modular design of the absorber tubes. A defective or spent absorber tube may be easily replaced with a new functional absorber tube without the need for replacing the entire reactor assembly or causing significant delay or disruption in reactor production.

EXAMPLES

Example 1

Figure 13:
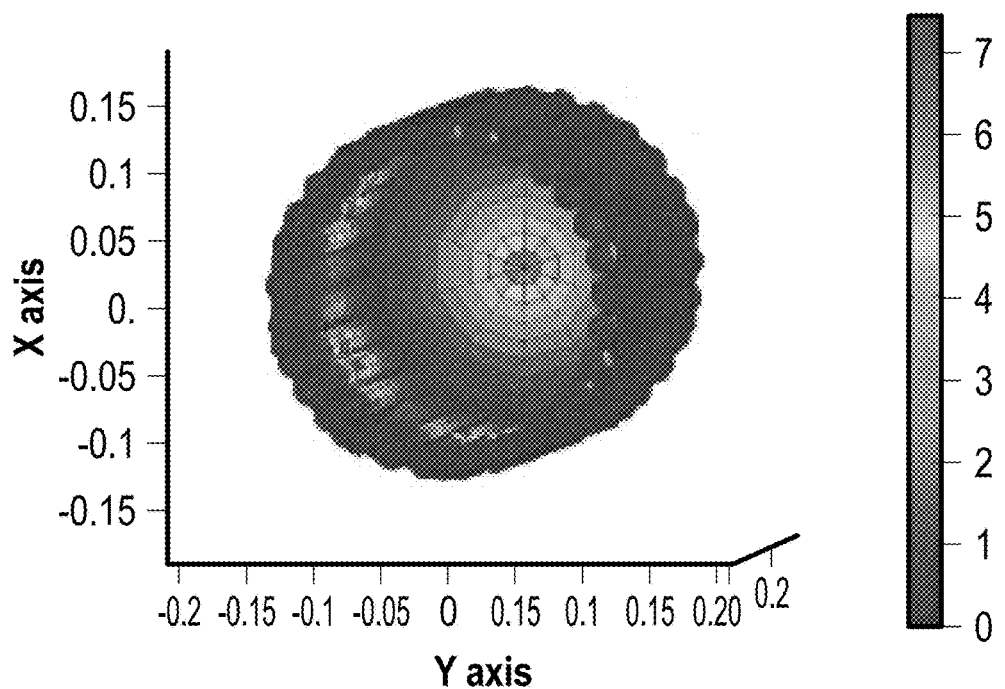
FIG. 13 is a graph depicting the flux modeling of an exemplary solar thermochemical reactor having a horizontal (longitudinal) orientation.
Figure 14:
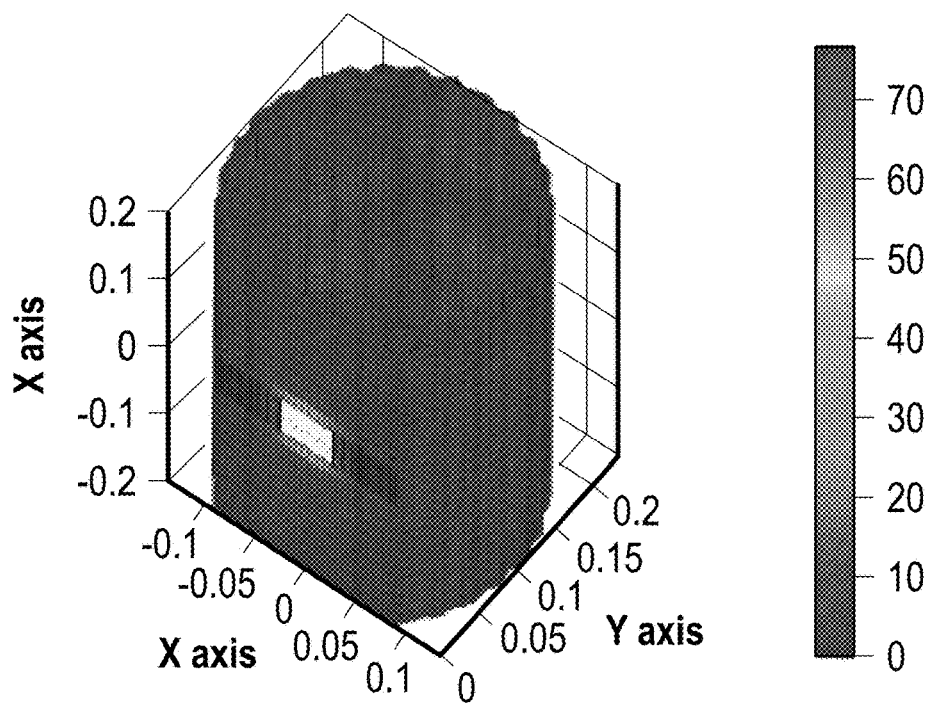
FIG. 14 is a graph depicting the flux modeling of a comparative solar thermochemical reactor having a vertical (latitudinal) orientation.

As shown in FIG. 13, a graph depicting the flux modeling of a horizontally orientated reactor shows the thermal distribution in the reactor plotted along the x, y and z axes. The flux modeling was calculated using the VEGAS Monte Carlo Ray® Tracing Code. The horizontally oriented reactor has a plurality of absorber tubes disposed within a reactor member. The absorber tubes are oriented longitudinally at an angle of 0° relative to the center line of the reactor member. The horizontally oriented reactor also has an aperture that is horizontally oriented at an angle of 0° relative to the center line of the reactor member. As can be seen from FIG. 13, the thermal distribution of the horizontally oriented reactor is uniform around the area in the reactor member occupied by the absorber tubes. The bar to the right of the graph indicates the relative flux in temperature of the reactor. This graph demonstrates that the horizontally oriented reactor design affords a maximum and uniform distribution of heat to the reactive material in the absorber tubes, while minimizing the loss of heat from the absorber tubes and the reactor. The horizontal orientation of the reactor allows the absorber tubes to capture heat. The horizontal orientation of the reactor also provides a similar or nearly identical temperature profile for each absorber tube. The use of the absorber tubes in close proximity to one another in the above-described horizontal reactor design decrease thermal losses from the absorber tubes and the reactor. In contrast, FIG. 14 depicts the flux modeling of a vertically oriented reactor plotted along the x, y and z axes. The absorber tubes are oriented longitudinally at an angle of 0° relative to the center line of the reactor member. The vertically oriented reactor also has an aperture that is vertically oriented at an angle of 90° relative to the center line of the reactor member. As can be seen from FIG. 14, the thermal distribution of the vertically oriented reactor is uniform throughout the ends of the reactor member, not just the area occupied by the absorber tubes. This graph demonstrates that the vertically oriented reactor design does not provide a maximum amount and uniform distribution of heat to the absorber tubes, and suffers from the loss of heat in the absorber tubes and the reactor. Further, the vertically oriented reactor has less absorber tubes available for solar thermochemical conversion since the aperture itself occupies space in the reactor member. A vertically oriented reactor will thus have less room available for absorber tubes than a horizontally oriented reactor having a reactor member of equal hydraulic diameter. In addition, the absorber tubes in a vertically oriented reactor which are in closest proximity to the aperture will be exposed to less heat than the absorber tubes farthest away from the aperture.

Figure 15:
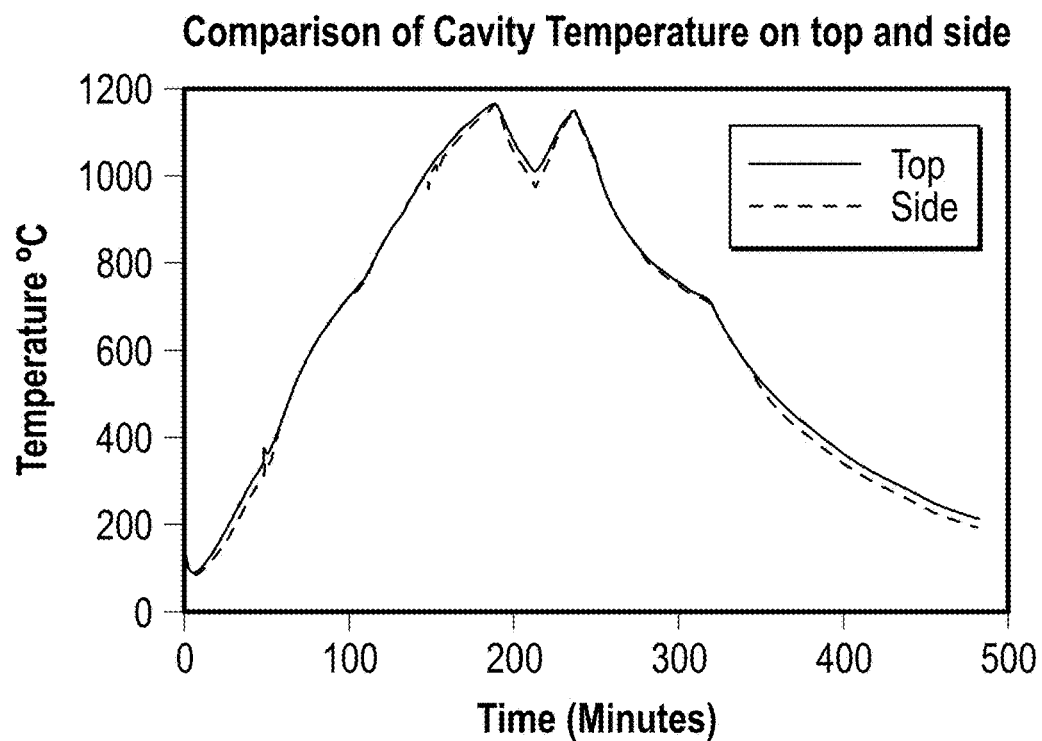
FIG. 15 is a graph of the thermal distribution of an exemplary solar thermochemical reactor having a horizontal (longitudinal) orientation.

As shown in FIG. 15, in which a graph of the temperature (° C.) in the reactor is plotted using thermocouples placed at different points, the side and the top, of the reactor at the same longitudinal (axial) points. As can be seen from the graph in FIG. 15, the temperature along the side of the reactor and the top of the reactor were nearly identical, demonstrating a uniform thermal distribution within the reactor.

Example 2

Figure 16:
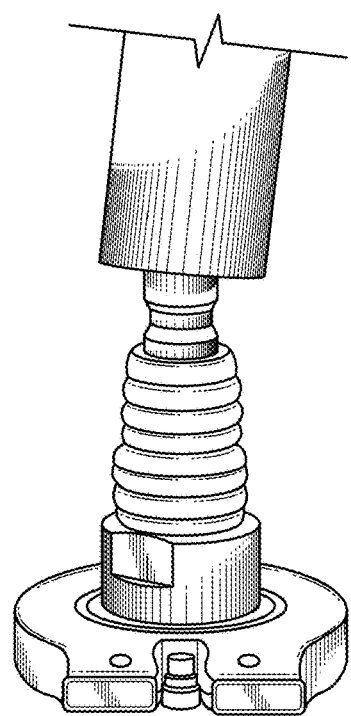
FIG. 16 is photograph of a dissembled absorber tube and seal assembly.

As shown in FIG. 16, a sealing assembly comprises a hose barb with multiple silicone or Kalrez® O-rings surrounding the hose barb. The sealing assembly has a low profile such that the outer diameter of the seal assembly does not exceed the outer diameter of the absorber tube, allowing for maximum coverage of the inner surface area of the cylinder by absorber tubes. This allows for less thermal losses and greater heat utilization. The sealing assembly is fixably attached to the absorber tube using the hose barb with O-rings.

Figure 17:
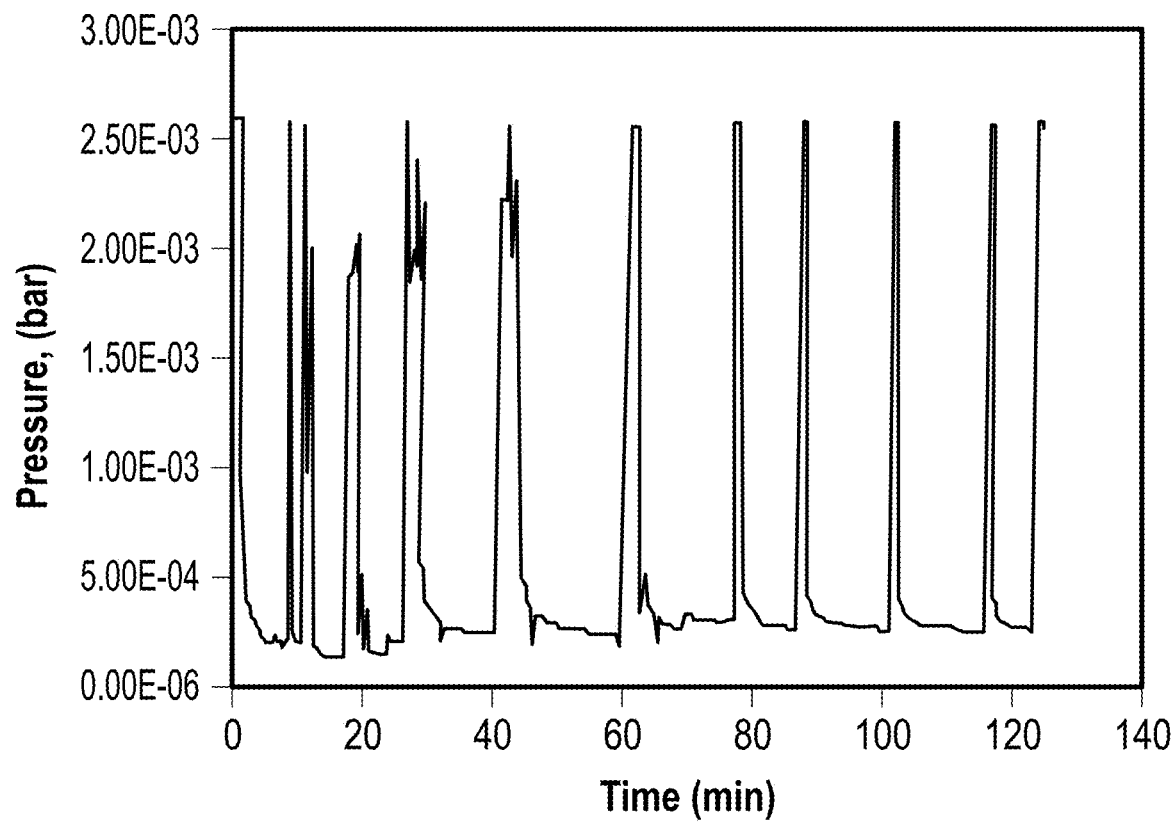
FIG. 17 is a graph plotting the pressure vs. time in an exemplary solar thermochemical reactor.

The pressure of the seal assembly depicted in FIG. 16 was tested under a $4 \times 10^{-4}$ bar pressure vacuum over time, the results of which are shown in FIG. 17. As shown in FIG. 17, the pressure was maintained at a relatively constant level at different time intervals.

Example 3

Figure 18:
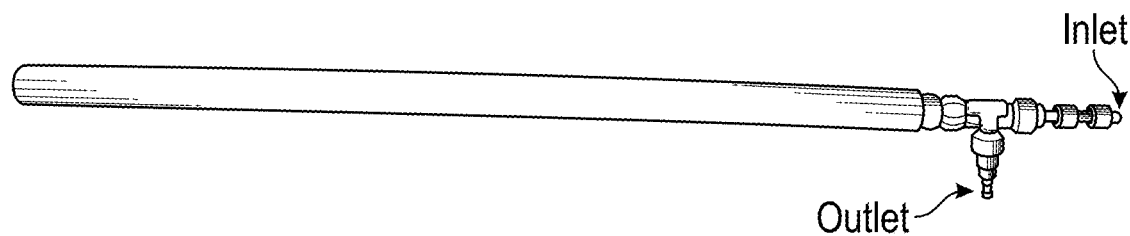
FIG. 18 is a photograph of an exemplary absorber tube and sealing assembly having a material inlet and a material outlet.

As shown in FIG. 18, an absorber tube with a seal assembly comprising a material inlet and a material outlet was employed in a solar reactor having the horizontal design described above with regard to FIG. 13. The absorber tube was made from aluminum oxide and was a tube-within-a-tube, having an outer tube body outer diameter of 25 mm and an inner tube outer diameter of 6 mm. A second absorber tube identical to the first absorber tube was also disposed within the reactor member. Although only two absorber tubes were employed in this example, the absorber tube was disposed in a position which would accommodate a full loading of 29 absorber tubes which form a circle along the full inner perimeter of the reactor member. The reactor member was made from a low density aluminosilicate material commercially available under the brand name Buster M-35® from Zicar Zirconia Corp. and has an outer diameter of 33.5 cm. The aperture was 5 cm in diameter.

Figure 19:
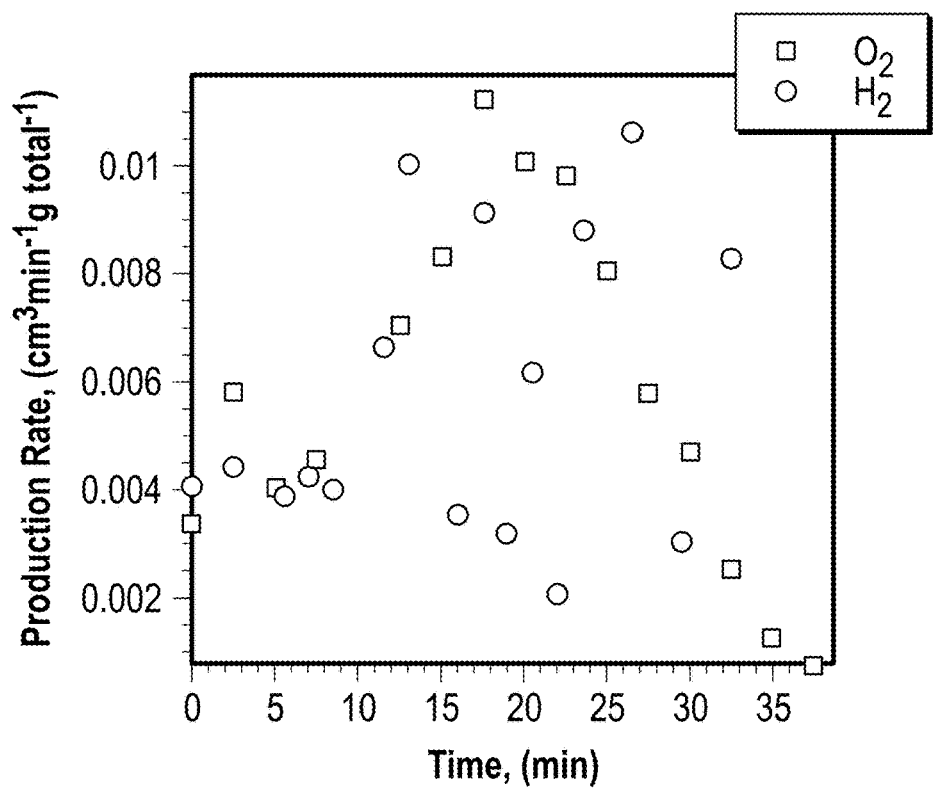
FIG. 19 is a graph plotting the production rate vs. time for an exemplary solar thermochemical reactor.

The first absorber tube was loaded with 26.8 g of a mixture of 20 wt % $Fe_3O_4$ and 80 wt % yttria-stabilized-zirconium (YSZ). A second absorber tube having a 25 mm outer diameter tube was disposed adjacent to the first absorber tube containing the reactor material, with a thermocouple located at approximately the same longitudinal direction as the material placed inside. The second absorber tube was used as a control, without the reactor material disposed therein, to measure the temperature inside the absorber tube and to estimate the approximate temperature of the reactor material in the first absorber tube. The reactor was exposed to simulated sunlight. The reactive material in the first absorber tube was initially oxidized to completion and then subjected to temperatures around 1450° C. to undergo thermal reduction using a sweep gas of 0.1 standard liters per minute (SLPM) of argon. After reduction, the material was cooled to about 1200° C. and subjected to approximately 0.1 g/min-1 of steam and 0.1 SPLM argon gas. The results of the production of oxygen and hydrogen gas over time are depicted in the graph in FIG. 19.

Example 4

Figure 20:
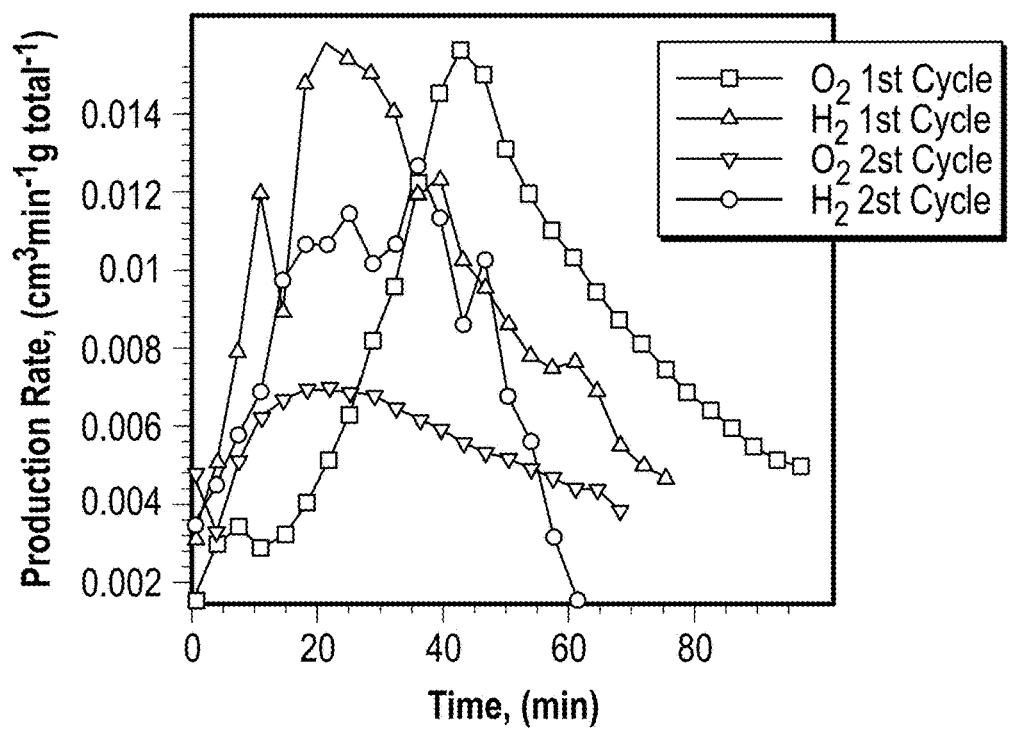
FIG. 20 is a graph plotting the production rate vs. time for another exemplary solar thermochemical reactor over two cycles.

In this example, the same reactor and absorber tube design described in Example 3 was employed, except that more reactive material was loaded into the first absorber tube. 65 g of 10 wt % $Fe_3O_4$ in YSZ were loaded into the first absorber tube. The reactants in the hottest part of the absorber tube were subjected to temperatures of about 1580° C. The increased loading of the reactive material in the absorber material resulted in a higher production rate of oxygen and hydrogen gases over time during two cycles. The results of the production of oxygen and hydrogen gas over time are depicted in the graph in FIG. 20.

Example 5

In this example, trials of thermal reduction under a vacuum of 8.8 g of 20 wt % iron in 8-mole percent yttrium stabilized zirconium oxide (8-YSZ) were conducted in an aluminum oxide tube in a high temperature tube furnace. A vacuum was pulled without the use of a sweep gas to successfully reduce the reactive material, as evidenced by the hydrogen produced in the subsequent oxidation cycle. Reduction proceeded by ramping the temperature to 1450° C. at 10° C. per minute and dwelling at 1450° C. for a specified amount of time.

Figure 21:
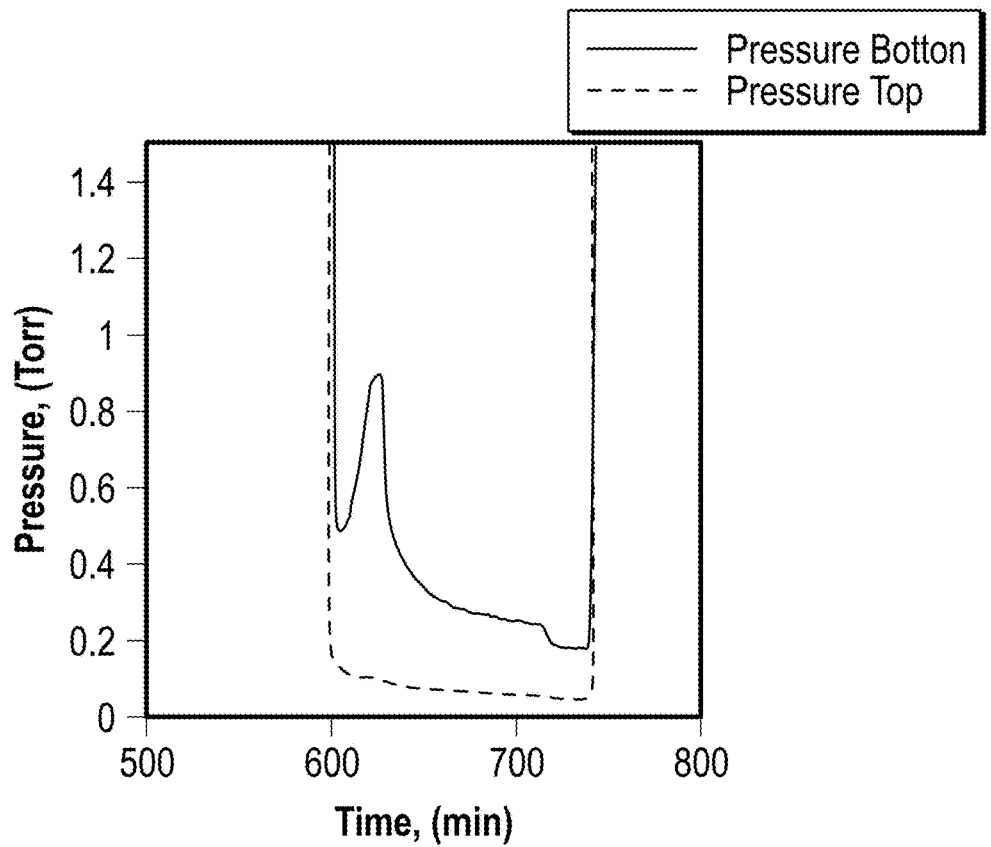
FIG. 21 is a graph plotting the pressure vs. time for an exemplary solar thermochemical reactor.
Figure 22:
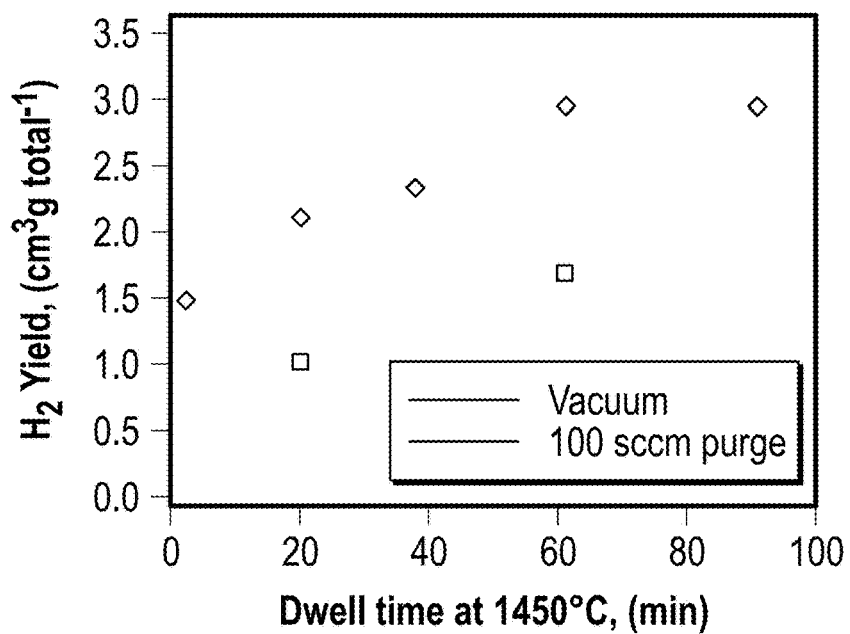
FIG. 22 is a graph plotting the H2 production rate vs. time for an exemplary solar thermochemical reactor.

The results of Example 5 are provided in FIGS. 21 and 22, which plot the pressure and $H_2$ production yield over time, respectively. As can be seen from FIG. 21, downstream pressure reached under 100 mTorr while pressure above the bed reached under 1 Torr. In addition, the pressure above the reactor material bed shows an increase or decrease corresponding to oxygen evolution caused by temperature increase. Steam oxidation proceeded after cooling to 1200° C. The results of this example demonstrate that vacuum pumping, i.e., without the aid of a sweep gas, is effective in decreasing the partial pressure of oxygen, and that the partial pressure of oxygen over the 8.84 grams of reactor material in the bed during the vacuum was lower than during a constant inert purge of 100 standard cubic centimeters per minute (sccm).

Example 6

Figure 23:
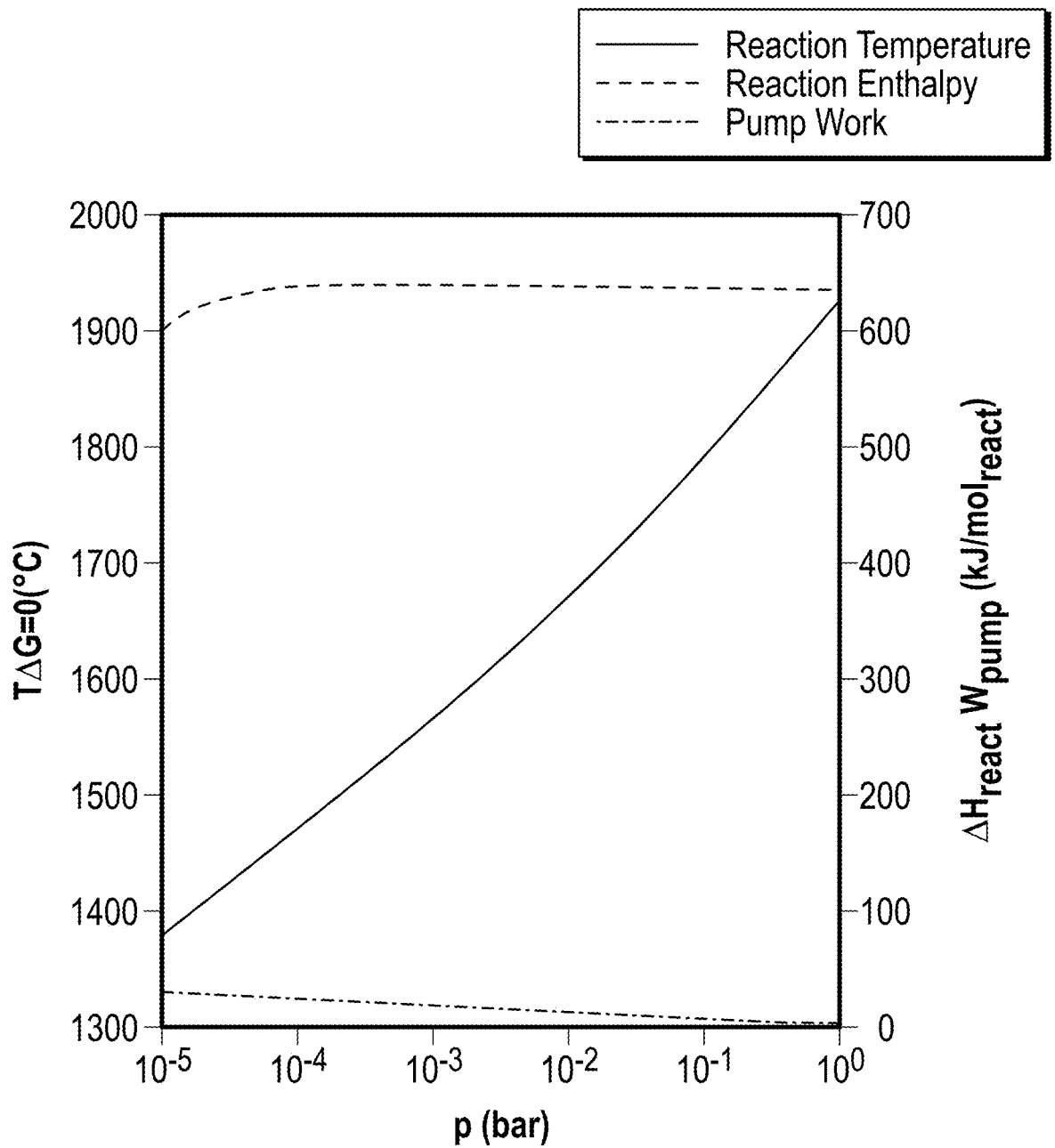
FIG. 23 is a graph depicting the disassociation temperature, reaction enthalpy and losses due to pump work as a function of absolute pressure of an exemplary reactive material.

As shown in FIG. 23, the theoretical data in the graph shows the disassociation temperature, reaction enthalpy, and losses due to pump work as a function of absolute pressure for the iron oxide reactor material matrix, specifically, the disassociation temperature as a function of pressure for the purely thermal reduction reaction temperature for which the Gibbs free energy change of reaction equals zero. The graph also shows the reaction enthalpy per mole of the reaction and the required pump work for isothermal compression after cooling to about 300K per mole of the reaction. In addition, the graph shows that the pump work is one to two orders of magnitude smaller than the reaction enthalpy, allowing for low pressure solar reduction.

What is claimed is:

1. A solar reactor comprising:
a reactor member;
an aperture for receiving solar radiation, the aperture being disposed in a plane on a wall of the reactor member, where the plane is oriented at any angle other than parallel relative to the centerline of the reactor member;
a plurality of absorber tubes, wherein the absorber tubes are oriented such that their respective centerlines are at an angle other than 90° relative to the centerline of the reactor member; and wherein the aperture has a hydraulic diameter that is from 0.2 to 4 times a hydraulic diameter of at least one absorber tube in the plurality of absorber tubes; and
a reactive material, the reactive material being disposed in the plurality of absorber tubes, and the reactive material consists of a first mixture of first particles and second particles, wherein the first particle consists only of magnetite ($Fe_3O_4$) and the second particle consists only of magnesium oxide.

2. The solar reactor of claim 1, where the composite particle has an average particle size of about 200 to about 2000 micrometers.

3. The solar reactor of claim 1, where the first particle has an average particle size of about 20 to about 80 micrometers, and where the second particle has an average particle size of about 0.5 to about 10 micrometers prior to a sintering.

4. The solar reactor of claim 1, where a weight ratio of the first particle to the second particle is about 1:4 to about 1:6.

5. The solar reactor of claim 1, where the composite particle has a surface area of greater than or equal to about 100 square meter per gram.

6. A solar reactor comprising:
a reactor member;
an aperture for receiving solar radiation, the aperture being disposed in a plane on a wall of the reactor member, where the plane is oriented at any angle other than parallel relative to the centerline of the reactor member;
a plurality of absorber tubes, wherein the absorber tubes are oriented such that their respective centerlines are at an angle other than 90° relative to the centerline of the reactor member; and wherein the aperture has a hydraulic diameter that is from 0.2 to 4 times a hydraulic diameter of at least one absorber tube in the plurality of absorber tubes; and
a reactive material, the reactive material being disposed in the plurality of absorber tubes, and the reactive material consists of a first mixture of first particles and second particles, wherein the first particle consists only of manganese dioxide ($MnO_2$) and the second particle consists only of magnesium oxide.

7. The solar reactor of claim 6, where the composite particle has an average particle size of about 200 to about 2000 micrometers.

8. The solar reactor of claim 6, where the first particle has an average particle size of about 20 to about 80 micrometers, and where the second particle has an average particle size of about 0.5 to about 10 micrometers prior to a sintering.

9. The solar reactor of claim 6, where a weight ratio of the first particle to the second particle is about 1:4 to about 1:6.

10. The solar reactor of claim 6, where the composite particle has a surface area of greater than or equal to about 100 square meter per gram.

\* \* \* \* \*

UNITED STATES PATENT AND TRADEMARK OFFICE
CERTIFICATE OF CORRECTION

| | | |
|---|---|---|
| PATENT NO. | : 10,906,017 B2 | Page 1 of 1 |
| APPLICATION NO. | : 15/645239 | |
| DATED | : February 2, 2021 | |
| INVENTOR(S) | : James F. Klausner et al. | |

It is certified that error appears in the above-identified patent and that said Letters Patent is hereby corrected as shown below:

In the Specification

Statement Regarding Federally Sponsored Research or Support

Column 1, Lines 18-19: "This invention was made with Government support under DE AR000184 awarded by the Department of Energy." should read "This invention was made with Government support under DE AR0000184 awarded by the Department of Energy."

Signed and Sealed this
Seventh Day of June, 2022

*Katherine Kelly Vidal*

Katherine Kelly Vidal
*Director of the United States Patent and Trademark Office*